United States Patent [19]
Clough et al.

[11] Patent Number: 5,271,858
[45] Date of Patent: Dec. 21, 1993

[54] FIELD DEPENDENT FLUIDS CONTAINING ELECTRICALLY CONDUCTIVE TIN OXIDE COATED MATERIALS

[75] Inventors: Thomas J. Clough, Santa Monica; Victor L. Grosvenor, Topanga; Naum Pinsky, Thousand Oaks, all of Calif.

[73] Assignee: Ensci Inc., Santa Monica, Calif.

[21] Appl. No.: 815,511

[22] Filed: Oct. 2, 1992

Related U.S. Application Data

[60] Continuation-in-part of Ser. No. 770,557, Oct. 3, 1991, which is a continuation-in-part of Ser. No. 621,660, Dec. 3, 1990, Pat. No. 5,204,140, which is a continuation-in-part of Ser. No. 348,789, May 8, 1989, Pat. No. 5,167,820, which is a continuation-in-part of Ser. No. 348,788, May 8, 1989, Pat. No. 5,039,845, which is a continuation-in-part of Ser. No. 348,787, May 8, 1989, abandoned, which is a continuation-in-part of Ser. No. 348,786, May 8, 1989, Pat. No. 5,182,165, which is a continuation-in-part of Ser. No. 272,517, Nov. 17, 1988, abandoned, which is a continuation-in-part of Ser. No. 272,539, Nov. 17, 1988, abandoned, which is a continuation-in-part of Ser. No. 82,277, Aug. 6, 1987, Pat. No. 4,787,125, which is a division of Ser. No. 843,047, Mar. 24, 1986, Pat. No. 4,713,306.

[51] Int. Cl.$^5$ ............... C10M 171/00; C10M 169/04
[52] U.S. Cl. ........................ 252/74; 252/73; 252/75; 252/572
[58] Field of Search ............. 252/73, 74, 75, 572, 252/62.53, 62.52

[56] References Cited

U.S. PATENT DOCUMENTS

| | | | |
|---|---|---|---|
| 2,564,707 | 8/1951 | Mochel | 428/432 |
| 2,661,596 | 12/1953 | Winslow | 60/326 |
| 3,004,875 | 10/1961 | Lytle | 427/110 |
| 3,005,731 | 10/1961 | Payne | 427/108 |
| 3,367,872 | 2/1968 | Martinek et al. | 252/74 |
| 3,385,793 | 5/1968 | Klass et al. | 252/75 |
| 3,544,361 | 12/1970 | Servais | 427/108 |
| 3,562,124 | 2/1971 | Leon | 204/148 |
| 3,562,127 | 2/1971 | Wooton et al. | 204/164 |
| 3,577,273 | 5/1971 | Soderberg | 427/108 |
| 3,713,884 | 1/1973 | Maley | 427/64 |
| 3,870,567 | 3/1975 | Palmer et al. | 156/167 |
| 3,890,429 | 6/1975 | Pytlewski | 423/395 |
| 3,932,694 | 1/1976 | Hamaguchi et al. | 428/432 |
| 3,959,565 | 5/1976 | Jordan et al. | 428/432 |
| 4,108,107 | 8/1978 | Scheuermann | 118/730 |
| 4,229,491 | 10/1980 | Dislich et al. | 427/160 |
| 4,240,882 | 12/1980 | Ang et al. | 204/75 |
| 4,258,080 | 3/1981 | Sonada et al. | 437/159 |
| 4,263,335 | 4/1981 | Wagner et al. | 427/483 |
| 4,297,420 | 10/1981 | Chenaux et al. | 429/217 |
| 4,326,017 | 4/1982 | Will | 429/228 |
| 4,336,282 | 6/1982 | Sato et al. | 427/125 |
| 4,349,369 | 9/1982 | Van Laethem et al. | 65/60.4 |
| 4,371,740 | 2/1983 | Clem | 136/256 |
| 4,451,542 | 5/1984 | Ishida et al. | 429/174 |

(List continued on next page.)

FOREIGN PATENT DOCUMENTS

| | | |
|---|---|---|
| 0116785 | 8/1984 | European Pat. Off. |
| 0130575 | 1/1985 | European Pat. Off. |
| 0172563 | 2/1986 | European Pat. Off. |
| 0361931 | 4/1990 | European Pat. Off. |
| 0394049 | 10/1990 | European Pat. Off. |
| 863970 | 4/1941 | France |
| 995222 | 11/1951 | France |
| 2132440 | 11/1972 | France |
| 53-9807 | 1/1978 | Japan |
| 63-97694 | 4/1988 | Japan |
| 1572333 | 7/1980 | United Kingdom |
| 2199336 | of 1988 | United Kingdom |

OTHER PUBLICATIONS

"Electroless Deposition of SnO$_2$ and Antimony Doped (List continued on next page.)

Primary Examiner—Christine Skane
Attorney, Agent, or Firm—Frank J. Uxa

[57] ABSTRACT

A field dependent fluid comprising a liquid phase and an inorganic particulate solid substrate having a coating containing electrically conductive tin oxide on at least a portion thereof, said coated substrate being adapted and structured to provide an electrorheological response to the presence of one or more electrical and/or magnetic fields.

30 Claims, 1 Drawing Sheet

U.S. PATENT DOCUMENTS

| | | | |
|---|---|---|---|
| 4,502,931 | 3/1985 | Asano et al. | 204/192.34 |
| 4,510,219 | 4/1985 | Rowlette | 429/212 |
| 4,535,315 | 8/1985 | Sakai | 338/34 |
| 4,539,268 | 9/1985 | Rowlette | 429/54 |
| 4,542,082 | 9/1985 | Rowlette | 429/210 |
| 4,547,443 | 10/1985 | Rowlette | 429/217 |
| 4,606,941 | 8/1986 | Jenkin | 427/217 |
| 4,614,669 | 9/1986 | Yannopoulos | 437/236 |
| 4,664,935 | 5/1987 | Strahl | 204/192.1 |
| 4,681,777 | 7/1987 | Engelken et al. | 427/98 |
| 4,687,589 | 8/1987 | Block et al. | 252/73 |
| 4,713,306 | 12/1987 | Pinsky et al. | 429/218 |
| 4,744,914 | 5/1988 | Filisko et al. | 252/74 |
| 4,772,407 | 9/1988 | Carlson | 252/74 |
| 4,818,437 | 4/1989 | Wiley | 252/511 |
| 4,818,438 | 4/1989 | Wiley | 252/511 |
| 4,879,056 | 11/1989 | Filisko et al. | 252/74 |

OTHER PUBLICATIONS $SnO_2$ Films," D. Raviendra et al., J. Phys Chem Solids, vol. 46, No. 8, pp. 945–950, 1985, USA.

"Sn(Sb)–Oxide Sol–Gel Coatings on Glass," C. J. R. Gonzalez–Oliver et al., J. Non–Crystalline Solids 82, pp. 400–410, 1986, Amsterdam.

"Physical Properties of Tin Oxide Films Deposited by Oxidation of $SnCl_2$," N. S. Murty et al., Thin Solid Films 92, pp. 347–354, 1982, The Netherlands.

"Tin Dioxide Gas Sensors," Part 1, J. F. McAleer et al., J. Chem. Soc., Faraday Trans I, 83, pp. 1323–1346, 1987.

"Tin Dioxide Gas Sensors," Part 2, J. F. McAleer et al., J. Chem. Soc., Faraday Trans I, 83, pp. 441–457, 1988.

"Preparation of Thick Crystalline Films of Tin Oxide and Porous Glass Partially Filled with Tin Oxide," J. Electrochem. Soc. 116, pp. 1205–1208, Sep. 1969.

"The Catalyzed Conversion of Methane to Methanol at High Pressure", N. R. Hunter et al., Symp Hydrocarbon Oxidation, Amer. Chem. Soc., 1987.

"A Review of Tin Oxide–Based Catalytic Systems: Preparation, Characterization and Catalytic Behavior",: G. B. Hoflund, NASA Conference Publication 2456, pp. 179–192, 1987.

"Sol–Gel Glass Research," Technology Forecasts and Technology Surveys, pp. 5–7, 1983.

"High Selectivity of CVD $SnO_2/SiO_2$ Catalyst for Oxidative Dehydrogenation of Ethylbenzene," T. Hattori, et al., Prep of Catalysts IV, pp. 113–123, 1987.

"Electro Rheology," H. Block et al., J. Phys D. Appl. Phys 21 (1988), pp. 1661–1677.

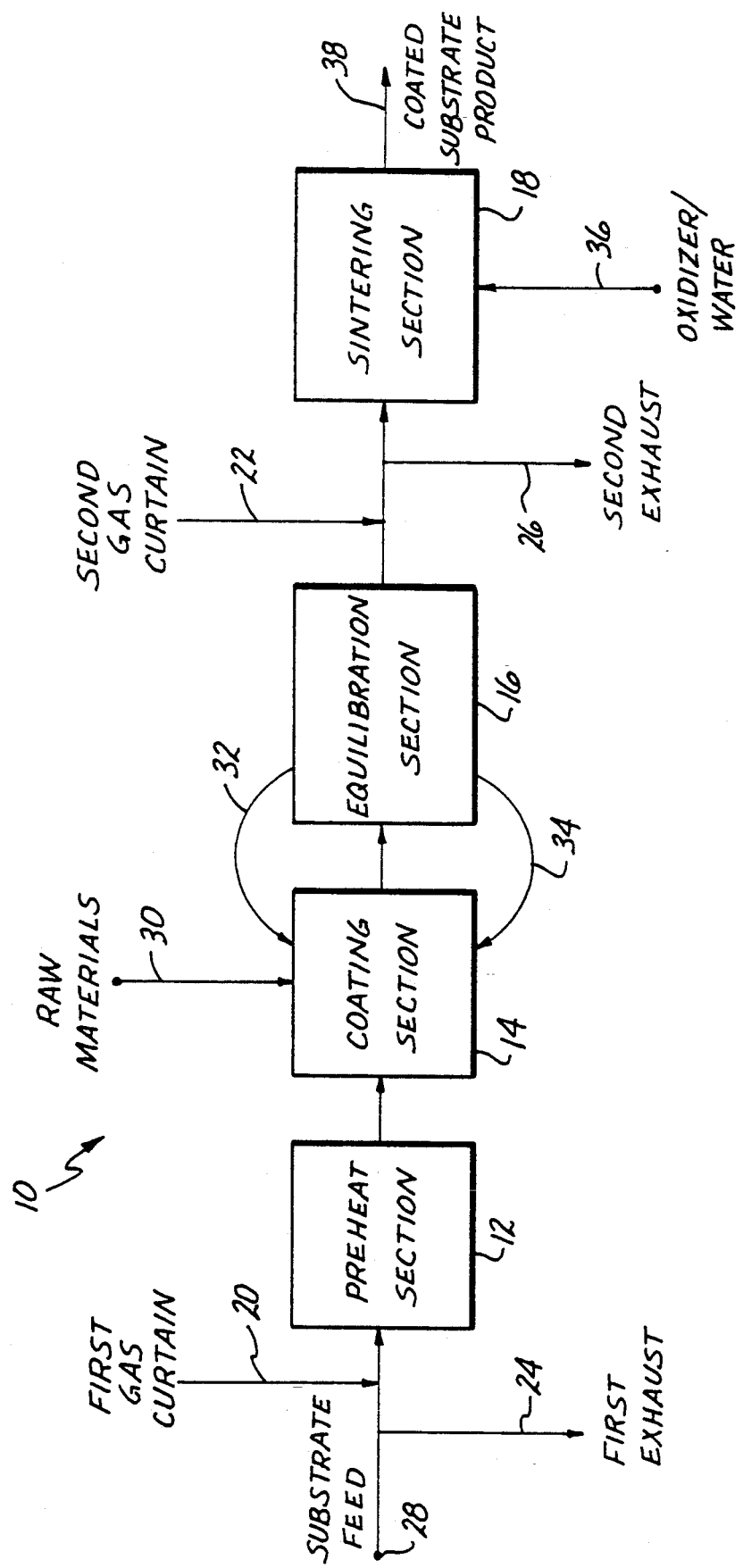

FIELD DEPENDENT FLUIDS CONTAINING ELECTRICALLY CONDUCTIVE TIN OXIDE COATED MATERIALS

RELATED APPLICATIONS

This application is a continuation in part of application Ser. No. 770,557, filed Oct. 3, 1991 which application is a continuation in part of application Ser. No. 621,660 filed Dec. 3, 1990 now U.S. Pat. No. 5,204,140 which application in turn is a continuation-in-part of application Ser. Nos. 348,789 now U.S. Pat. No. 5,167,820; 348,788 now U.S. Pat. No. 5,039,845; 348,787 now abandoned and 348,786 now U.S. Pat. No. 5,182,165 each filed May 8, 1989, each of which applications is a continuation-in-part of application Ser. Nos. 272,517 now abandoned and 272,539 now abandoned, each filed Nov. 17, 1988, each of which application in turn, is a continuation-in-part of application Ser. No. 082,277, filed Aug. 6, 1987 (now U.S. Pat. No. 4,787,125) which application, in turn, is a division of application Ser. No. 06/843,047, filed Mar. 24, 1986, now U.S. Pat. No. 4,713,306. Each of these earlier filed applications and these U.S. Patents is incorporated in its entirety herein by reference.

BACKGROUND OF THE INVENTION

The present invention relates to a process for coating a substrate. More particularly, the invention relates to coating a substrate with a tin oxide-containing material, preferably an electrically conductive tin oxide-containing material.

The present invention, in addition, relates to field dependent fluids, more particularly to improved electric field dependent fluids, wherein the fluids exhibit a reversible rise in viscosity and a corresponding change in sheer stress in the presence of an electric field.

An application where substrates with coatings, e.g., electrically conductive and/or polarizable coatings can find particular usefulness are field dependent fluids which exhibit a reversible viscosity rise in the presence of an applied electric field which viscosity can be pronounced particularly by exhibiting resistance to sheer in response to the application of an electric field. The electric field dependent fluids are generally known as electro viscous and/or electro rheological fluids and have been referred to in the prior art as exhibiting the Winslow Effect. The fluids generally comprise a non-conductive liquid having a low to a high dielectric constant and having a suspension of solid particles, particularly finely divided particles.

In many of the prior art fluids, water has been incorporated into the fluid as a critical element to achieve the desired viscosity change. Such fluids are described in U.S. Patents to Winslow for example U.S. Pat. Nos. 2,147,850, 2,661,596, 2,661,825 and 3,047,507. In U.S. Pat. No. 2,661,596 a micronized silica gel powder is combined with an electrically stable oily vehicle and about 15 parts by weight of water. In addition, various oil soluble dispersing agents and water soluble dispersing agents are incorporated into the electro viscous fluid. In addition, certain gelatinous metallic hydrates of ferric oxide and stannous oxide can be substituted for certain of the water soluble ingredients.

A number of alternatives to silica have been investigated such as alumina, silica alumina in combination with a surface active agent, an amine, fatty acid and water, as disclosed in U.S. Pat. No. 3,367,872 to Martinek, et al, and the use of particulate conductive metal such as copper iron, aluminum, zinc, bronze and lead as disclosed in U.S. Pat. No. 3,385,793 to Klass, et al. A variety of polar materials including water were used by Klass, et al, to activate the electro viscous fluids. In addition, various amines and lower hydroxy hydrocarbons were found to be efficient as activators.

The use of water activated systems in general limits the effective upper temperature of the system to about 70° C. At temperatures in excess of 70° C. fluids gradually lose water and thus, a reduced effect occurs. The problems associated with water activated systems and/or low boiling alcohol, amine and hydroxy type activated systems have been approached through the use of certain solid particulates which are substantially free of water. For example, U.S. Pat. No. 4,744,914 discloses a dispersed particulate crystalline zeolite material, whereas U.S. Pat. No. 4,879,056 discloses a dispersed particulate organic polymeric polyelectrolyte material. Such zeolite and organic polyelectrolyte materials are substantially free of adsorbed water. In addition to these materials, Block, et al, U.S. Pat. No. 4,687,589, prefers organic semi-conductors which comprise an unsaturated, fused polycyclic system as a particulate solid in an insulating fluid. In the review article Electrorheology by Block, et al, Journal of Physics, D, Applied Physics, Vol. 21, 1988, at pages 1661–1677, Block, et al, reviews the various compositions, their deficiencies and their preference for certain organic semi-conductors.

A number of applications have been proposed for field dependent fluids, i.e., eletrorheological fluids including shock absorbers, variable speed transmissions, clutch mechanisms, torque converters and various other applications in dampening, robotics and hydraulics.

In many of the above-noted applications it would be advantageous to have an electrically, electronically conductive and/or electro mechanical particulate which is substantially uniform, has system designed electronic conductivity and/or polarizability has good chemical properties, e.g., morphology, stability, has good mechanical properties and has good fluid compatability and stability.

In addition, in many of the above noted applications it would be advantageous to have particulates which are electrorheologically effective in fluids over a wide temperature range, including temperatures above 70° C. and which can exhibit improved particle integrity during use while being reversibly cycled in viscosity.

A number of techniques may be employed to provide conductive tin oxide coatings on substrates. For example, the chemical vapor deposition (CVD) process may be employed. This process comprises contacting a substrate with a vaporous composition comprising a tin component and a dopant-containing material and contacting the contacted substrate with an oxygen-containing vaporous medium at conditions effective to form the doped tin oxide coating on the substrate. Conventionally, the CVD process occurs simultaneously at high temperatures at very short contact times so that tin oxide is initially deposited on the substrate. However tin oxide can form off the substrate resulting in a low reagent capture rate. The CVD process is well known in the art for coating a single flat surface which is maintained in a fixed position during the above-noted contacting steps. The conventional CVD process is an example of a "line-of-sight" process or a "two dimensional" process in which the tin oxide is formed only on that portion of the substrate directly in the path of the tin source as tin oxide is formed on the substrate. Portions of the substrate, particularly internal surfaces, which are shielded from the tin oxide being formed, e.g., such as pores which extend inwardly from the external surface and substrate layers which are internal at least partially shielded from the depositing tin oxide source by one or more other layers or surfaces closer to the external substrate surface being coated, do not get uniformly coated, if at all, in a "line-of-sight" process. Such shielded substrate portions either are not being contacted by the tin source during line-of-sight processing or are being contacted, if at all, not uniformly by the tin source during line-of-sight processing. A particular problem with "line-of-sight" processes is the need to maintain a fixed distance between the tin source and the substrate. Otherwise, tin dioxide can be deposited or formed off the substrate and lost, with a corresponding loss in process and reagent efficiency.

One of the preferred substrates for use in field dependent fluids are inorganic substrates, in particular particles such as flakes, spheres, fibers and other type particles. Although the CVD process is useful for coating a single flat surface, for the reasons noted above this process tends to produce non-uniform and/or discontinuous coatings on non-flat, non-equidistant surfaces and/or three dimensional surfaces having inner shielded surfaces and/or the processing is multi-step and/or complex and/or time consuming. Such non uniformities and/or discontinuities and/or processing deficiencies are detrimental to the electrical and chemical properties of the coated substrate. A new process, e.g., a "non-line-of-sight" or "three dimensional" process, useful for coating such substrates would be advantageous. As used herein, a "non-line-of-sight" or "three dimensional" process is a process which coats surfaces of a substrate with tin oxide which surfaces would not be directly exposed to tin oxide-forming compounds being deposited on the external surface of the substrate during the first contacting step and/or to improve the processability to conductive components and articles and/or for the type of substrate to be coated. In other words, a "three dimensional" process coats coatable substrate surfaces which are at least partially shielded by other portions of the substrate which are closer to the external surface of the substrate and/or which are further from the tin oxide forming source during processing, e.g., the internal and/or opposite side surfaces of glass or ceramic particles such as fiber or spheres, or flakes or other shapes or surfaces.

Although a substantial amount of work has been done, there continues to be a need for a new method for coating substrates, particularly three dimensional substrates with tin oxides. The prior art processes described below follow conventional processing techniques such as by sintering of a tin oxide and/or the instantaneous conversion to tin oxide by spray pyrolysis.

For example in "Preparation of Thick Crystalline Films of Tin Oxide and Porous Glass Partially Filled with Tin Oxide," R. G. Bartholomew et al, J. Electrochem, Soc. Vol. 116, No. 9, p1205(1969), a method is described for producing films of $SnO_2$ on a 96% silica glass substrate by oxidation of stannous chloride. The plates of glass are pretreated to remove moisture, and the entire coating process appears to have been done under anhydrous conditions. Specific electrical resistivity values for $SnO_2$-porous glass were surprisingly high. In addition, doping with $SbCl_3$ was attempted, but substantially no improvement, i.e., reduction, in electrical resistivity was observed. Apparently, no effective amount of antimony was incorporated. No other dopant materials were disclosed.

In "Physical Properties of Tin Oxide Films Deposited by Oxidation of $SnCl_2$," by N. Srinivasa Murty et al, Thin Solid Films, 92(1982) 347–354, a method for depositing $SnO_2$ films was disclosed which involved contacting a substrate with a combined vapor of $SnCl_2$ and oxygen. Although no dopants were used, dopant elements such as antimony and fluorine were postulated as being useful to reduce the electrical resistivity of the $SnO_2$ films.

This last described method is somewhat similar to the conventional spray pyrolysis technique for coating substrates. In the spray pyrolysis approach tin chloride dissolved in water at low pH is sprayed onto a hot, i.e., on the order of about 600° C., surface in the presence of an oxidizing vapor, e.g., air. The tin chloride is immediately converted, e.g., by hydrolysis and/or oxidation, to $SnO_2$, which forms a film on the surface. In order to get a sufficient $SnO_2$ coating on a glass fiber substrate to allow the coated substrate to be useful as a component of a lead-acid battery, on the order of about 20 spraying passes on each side have been required. In other words, it is frequently difficult, if not impossible, with spray pyrolysis to achieve the requisite thickness and uniformity of the tin oxide coating on substrates, in particular three dimensional substrates.

Dislich, et al U.S. Pat. No. 4,229,491 discloses a process for producing cadmium stannate layers on a glass substrate. The process involved dipping the substrate into an alcoholic solutio of a reaction product containing cadmium and tin; withdrawing the substrate form the solutio in a humid atmosphere; and gradually heating the coated substrate to 650° C. whereby hydrolysis and pyrolysis remove residues from the coated substrate. Dislich, et al is not concerned with coating substrates for lead-acid batteries, let alone the stability required, and is not concerned with maintaining a suitable concentration of a volatile dopant, such as fluoride, in the coating composition during production of the coated substrate.

Pytlewski U.S. Pat. No. 4,229,491 discloses changing the surface characteristics of a substrate surface, e.g., glass pane, by coating the surface with a tin-containing polymer. These polymers, which may contain a second metal such as iron, cobalt, nickel, bismuth, lead, titanium, canadium, chromium, copper, molybdenum, antimony and tungsten, are prepared in the form of a colloidal dispersion of the polymer in water. Pytlewski discloses that such polymers, when coated on glass surfaces, retard soiling. Pytlewski is not concerned with the electrical properties of the polymers or of the coated substrate surfaces.

Gonzalez-Oliver, C. J. R. and Kato, I. in "Sn (Sb)-Oxide Sol-Gel Coatings of Glass," Journal of Non-Crystalline Solids 82(1986) 400–410 North Holland, Amsterdam, describe a process for applying an electrically conductive coating to glass substrates with solutions containing tin and antimony. This coating is applied by repeatedly dipping the substrate into the solution of repeatedly spraying the solutio onto the substrate. After each dipping or spraying, the coated substrate is subjected to elevated temperatures on the order to 550° C.–600° C. to fully condense the most recently applied layer. Other workers, e.g., R. Pryane and I.

Kato, have disclosed coating glass substrates, such as electrodes, with doped tin oxide materials. The glass substrate is dipped into solution containing organo-metallic compounds of tin and antimony. although multiple dippings are disclosed, after each dipping the coated substrate is treated at temperatures between 500° C. and 630° C. to finish off the polycondensation reactions, particularly to remove deleterious carbon, as well as to increase the hardness and density of the coating.

SUMMARY OF THE INVENTION

A new process for at least partially coating a substrate with a tin oxide-forming material has been discovered. In brief, the process comprises contacting the substrate with a tin oxide precursor, for example, stannous chloride, in a vaporous form and/or in a liquid form and/or in a solid (e.g., powder) form, to form a tin oxide precursor-containing coating, for example, a stannous chloride-containing coating, on the substrate; preferably contacting the substrate with a fluorine component, i.e., a component containing free fluorine and/or combined fluorine (as in a compound), to form a fluorine component-containing coating on the substrate; and contacting the coated substrate with an oxidizing agent to form a tin oxide-containing, preferably tin dioxide-containing, coating on the substrate. The contacting of the substrate with the tin oxide precursor and with the fluorine component can occur together, i.e., simultaneously, and/or in separate steps.

This process can provide coated substrates which have system designed electrical conductivity and/or polarizability so as to be suitable for use as components in field dependent fluids. Substantial coating uniformity, e.g., in the thickness of the tin oxide-containing coating and in the distribution of dopant component in the coating, is obtained. Further, the present fluorine or fluoride doped tin oxide coated substrates have outstanding stability, e.g., in terms of electrical properties and morphology, and are thus useful in various applications. In addition, the process is efficient in utilizing the materials which are employed to form the coated substrate.

The tin oxide/substrate combinations, e.g., the tin oxide coated substrates of the present invention are particularly useful in field dependent fluids including electrorheological fluids, particularly electric field dependent fluids.

DETAILED DESCRIPTION OF THE INVENTION

In one broad aspect, the present coating process comprises contacting a substrate with a composition comprising a tin oxide precursor, such as tin chloride forming components, including stannic chloride, stannous chloride, tin complexes and mixtures thereof, preferably stannous chloride, at conditions, preferably substantially non-deleterious oxidizing conditions, more preferably in a substantially inert environment or atmosphere, effective to form a tin oxide precursor-containing coating, such as a stannous chloride-containing coating, on at least a portion of the substrate. The substrate is preferably also contacted with at least one dopant-forming component, such as at least one fluorine component, at conditions, preferably substantially non-deleterious oxidizing conditions, more preferably in a substantially inert atmosphere, effective to form a dopant-forming component-containing coating, such as a fluorine component-containing coating, on at least a portion of the substrate. This substrate, including one or more coatings containing tin oxide precursor, for example tin chloride and preferably stannous chloride, and preferably a dopant-forming component, for example a fluorine component, is contacted with at least one oxidizing agent at conditions effective to convert the tin oxide precursor to tin oxide and form a tin oxide-containing, preferably tin dioxide-containing, coating, preferably a doped, e.g., fluorine or fluoride doped, tin oxide-containing coating, on at least a portion of the substrate. By "non-deleterious oxidation" is meant that the majority of the oxidation of tin oxide precursor, for example stannous chloride, coated onto the substrate takes place in the oxidizing agent contacting step of the process after distribution and/or equilibration of the precursor, rather than in process step or steps conducted at non-deleterious oxidizing conditions. The process as set forth below will be described in many instances with reference to stannous chloride, which has been found to provide particularly outstanding process and product properties. However, it is to be understood that other suitable tin oxide precursors are included within the scope of the present invention.

The dopant-forming component-containing coating may be applied to the substrate before and/or after and/or during the time the substrate is coated with stannous chloride. In a particularly useful embodiment, the stannous chloride and the dopant-forming component are both present in the same composition used to contact the substrate so that the stannous chloride-containing coating further contains the dopant-forming component. This embodiment provides processing efficiencies since the number of process steps is reduced (relative to separately coating the substrate with stannous chloride and dopant-forming component). In addition, the relative amount of stannous chloride and dopant-forming component used to coat the substrate can be effectively controlled in this "single coating composition" embodiment of the present invention.

In another useful embodiment, the substrate with the stannous chloride-containing coating and the dopant-forming component-containing coating is maintained at conditions, preferably at substantially non-deleterious oxidizing conditions, for example, conditions which reduce and/or minimize the formation of tin oxide on a relatively small portion of the substrate or off the substrate, for a period of time effective to do at least one of the following: (1) coat a larger portion of the substrate with stannous chloride-containing coating; (2) distribute the stannous chloride coating over the substrate; (3) make the stannous chloride-containing coating more uniform in thickness; and (4) distribute the dopant-forming component more uniformly in the stannous chloride-containing coating. Such maintaining preferably occurs for a period of time in the range of about 0.05 or 0.1 minute to about 20 minutes in the presence of an inert gas an/or oxygen i.e. air, under non-deleterious oxidizing conditions. Such maintaining is preferably conducted at the same or a higher temperature relative to the temperature at which the substrate/stannous chloride-containing composition contacting occurs. Such maintaining, in general, acts to make the coating more uniform and, thereby, for example, provides for beneficial electrical conductivity properties. The thickness of the tin oxide-containing coating is preferably in the range of about 0.1 micron to about 10 microns, more preferably about 0.25 micron to about 1.25 microns.

The stannous chloride which is contacted with the substrate is in a vaporous phase or state, or in a liquid phase or state, or in a solid state or phase (powder) at the time of the contacting. The composition which includes the stannous chloride preferably also includes the dopant-forming component or components. This composition may also include one or more other materials, e.g., dopants, catalysts, grain growth inhibitors, solvents, etc., which do not substantially adversely promote the premature hydrolysis and/or oxidation of the stannous chloride and/or the dopant-forming component, and do not substantially adversely affect the properties of the final product, such as by leaving a detrimental residue in the final product prior to the formation of the tin oxide-containing coating. Thus, it has been found to be important, e.g., to obtaining a tin oxide coating with good structural, mechanical and/or electronic properties, that undue hydrolysis of the tin chloride and dopant-forming component be avoided. This is contrary to certain of the prior art which actively utilized the simultaneous hydrolysis reaction as an approach to form the final coating. Examples of useful other materials include organic components such as acetonitrile, ethyl acetate, dimethyl sulfoxide, propylene carbonate and mixtures thereof; certain inorganic salts and mixtures thereof. These other materials, which are preferably substantially anhydrous, may often be considered as a carrier, e.g., solvent, for the tin chloride and/or dopant-forming component to be contacted with the substrate. It has also been found that the substrate can first be contacted with a tin oxide precursor powder, particularly stannous chloride powder, preferably with a film forming amount of such powder, followed by increasing the temperature of the powder to the liquidous point of the powder on the substrate and maintaining the coated substrate for a period of time at conditions including the increased temperature effective to do at least one of the following: (1) coat a larger portion of the substrate with the tin oxide precursor-containing coating; (2) distribute the coating over the substrate; and (3) make the coating more uniform in thickness. Preferably, this step provides for the equilibration of the coating on the substrate. The size distribution of the powder, for example, tin chloride powder, and the amount of such powder applied to the substrate are preferably chosen so as to distribute the coating over substantially the entire substrate.

The tin oxide precursor powder can be applied to the substrate as a powder, particularly in the range of about 5 or about 10 to about 125 microns in average particle size the size in part being a function of the particle size, i.e. smaller particles generally require smaller size powders. The powder is preferably applied as a charged fluidized powder, in particular having a charge opposite that of the substrate or at a temperature where the powder contacts and adheres to the substrate. In carrying out the powder coating, the coating system can be, for example, one or more electrostatic fluidized beds, spray systems having a fluidized chamber, and other means for applying powder, preferably in a film forming amount. The amount of powder used is generally based on the thickness of the desired coating and incidental losses that may occur during processing. The powder process together with conversion to a tin oxide-containing coating can be repeated to achieve desired coating properties, such as desired gradient conductivities.

Typically, the fluidizing gaseous medium is selected to be compatible with the tin oxide precursor powder, i.e., to not substantially adversely affect the formation of a coating the substrate during melting and ultimate conversion to a tin oxide-containing film.

Generally, gases such as air, nitrogen, argon, helium and the like, can be used, with air being a gas of choice, where no substantial adverse prehydrolysis or oxidation reaction of the powder precursor takes place prior to the oxidation-reaction to the tin oxide coating as previously discussed under equilibration and maintaining. The gas flow rate is typically selected to obtain fluidization and charge transfer to the powder. Fine powders require less gas flow for equivalent deposition. It has been found that small amounts of water vapor enhance charge transfer. The temperature for contacting the substrate with a powder precursor is generally in the range of about 0° C. to about 100° C. or higher, more preferably about 20° C. to about 40° C., and still more preferably about ambient temperature. The substrate however, can be at a temperatures the same as, higher or substantially higher than the powder.

The time for contacting the substrate with precursor powder is generally a function of the substrate bulk density, thickness, powder size and gas flow rate. The particular coating means is selected in part according to the above criteria, particularly the geometry of the substrate. For example, particles, i.e., spheres, flakes, short fibers and other similar substrate, can be coated directly in a fluidized bed themselves with such substrates being in a fluidized motion or state. For fabrics, single fibers, rovings and tows a preferred method is to transport the fabric and/or roving directly through a fluidized bed for powder contacting. In the case of rovings and tows, a fiber spreader can be used which exposes the filaments within the fiber bundle to the powder. The powder coating can be adjusted such that all sides of the substrate fabric, roving and the like are contacted with powder. Typical contacting time can vary from seconds to minutes, preferably in the range of about 1 second to about 120 seconds, more preferably about 2 seconds to about 30 seconds.

The fabrics, continuous single fibers, rovings and tows, which are coated in accordance with the process of this invention can be further processed such as by milling or chopping, to reduce the fiber geometry, particularly length to a geometry such as a short fiber and/or other particle, particularly cylindrical type particles. Such particles after size reduction will in general have surfaces resulting from size reduction which are not coated with a tin oxide coating. Such particles are useful for many of the applications as set forth herein, such as for example, such particles can be incorporated into polymer systems for subsequent use in for example induction heating of composites and/or incorporated into fluids to produce electric field dependent fluids.

Typical tin oxide precursor powders are those that are powders at powder/substrate contacting conditions and which are liquidous at the maintaining conditions, preferably equilibration conditions, of the present process. It is preferred that the powder on melting substantially wets the surface of the substrate, preferably having a low contact angle formed by the liquid precursor in contact with the substrate and has a relatively low viscosity and low vapor pressure at the temperature conditions of melting and maintaining, preferably melting within the range of about 100° C. to about 450° C. or higher, more preferably about 250° C. to about 400° C. Typical powder tin oxide precursors are stannous chloride, low molecular weight organic salts or complexes of tin, particularly low molecular weight organic salts and complexes such as stannous acetate and acetylacetonate complexes of tin.

An additional component powder, such as a dopant-forming powder, can be combined with the tin oxide precursor powder. A particularly preferred dopant-forming powder is stannous fluoride. Further, an additional component, such as a dopant, for example a fluorine or fluoride component, indium, or antimony can be incorporated into the coating during the maintaining step, for example hydrogen fluoride gas as a source of fluoride. A combination of the two methods can also be used for additional component incorporation.

The powder tin oxide precursor on melting is maintained and/or equilibrated as set forth above. In addition, temperatures can be adjusted and/or a component introduced into the melting/maintaining step which can aid in altering the precursor for enhanced conversion to tin oxide. For example, gaseous hydrogen chloride can be introduced to form partial or total halide salts and/or the temperature can be adjusted to enhance decomposition of, for example, tin organic salts and/or complexes to more readily oxidizable tin compounds. The dopant can also be present in an oxide or precursor form in the melt as a dispersed preferably as a finely dispersed solid. The oxide can be incorporated advantageously as part of the powder coating of the substrate material.

A fluidizable coated substrate, such as substrates coated directly in a fluid bed of powder, can be subjected to conditions which allow liquidus formation by the tin oxide precursor and coating of the substrate. A particularly preferred process uses a film forming amount of the tin oxide precursor which allows for coating during the liquidus step of the process, and which substantially reduces detrimental substrate agglomeration. The conditions are adjusted or controlled to allow substantially free substrate fluidization and transport under the conditions of temperature and bed density, such as dense bed density to lean bed density. The coated substrate can be further transported to the oxidation step for conversion to tin oxide or converted directly to tin oxide in the same reactor/processing system. In the former the liquidus coated substrate is transported as a dense bed to a fluidized oxidation zone, such zone being a fluidized zone preferably producing a conversion to tin oxide on the substrate of at least about 80% by weight.

The stannous chloride and/or dopant-forming component to be contacted with the substrate may be present in a molten state. For example, a melt containing molten stannous chloride and/or stannous fluoride and/or other fluoride salt may be used. The molten composition may include one or more other materials, having properties as noted above, to produce a mixture, e.g., a eutectic mixture, having a reduced melting point and/or boiling point. The use of molten stannous chloride and/or dopant-forming component provides advantageous substrate coating while reducing the handling and disposal problems caused by a solvent. In addition, the substrate is very effectively and efficiently coated so that coating material losses are reduced.

The stannous chloride and/or dopant-forming component to be contacted with the substrate may be present in a vaporous and/or atomized state. As used in this context, the term "vaporous state" refers to both a substantially gaseous state and a state in which the stannous chloride and/or dopant-forming component are present as drops or droplets and/or solid dispersion such as colloidal dispersion in a carrier gas, i.e., an atomized state. Liquid state stannous chloride and/or dopant-forming component may be utilized to generate such vaporous state compositions.

In addition to the other materials, as noted above, the composition containing stannous chloride and/or the dopant-forming component may also include one or more grain growth inhibitor components. Such inhibitor component or components are present in an amount effective to inhibit grain growth in the tin oxide-containing coating. Reducing grain growth leads to beneficial coating properties, e.g., higher electrical conductivity, more uniform morphology, and/or greater overall stability. Among useful grain growth inhibitor components are components which include at least one metal, in particular potassium, calcium, magnesium, silicon and mixtures thereof. Of course, such grain growth inhibitor components should have no substantial detrimental effect on the final product.

The dopant-forming component may be deposited on the substrate separately from the stannous chloride, e.g., before and/or during and/or after the stannous chloride/substrate contacting. If the dopant-forming component is deposited on the substrate separately from the stannous chloride, it is preferred that the dopant-forming component, for example, the fluorine component, be deposited after the stannous chloride, such as to form soluble and/or eutectic mixtures and/or dispersions.

Any suitable dopant-forming component may be employed in the present process. Such dopant-forming component should provide sufficient dopant so that the final doped tin oxide coating has the desired properties, e.g., electronic conductivity, stability, etc. Fluorine components are particularly useful dopant-forming components. Care should be exercised in choosing the dopant-forming component or components for use. For example, the dopant-forming component should be sufficiently compatible with the stannous chloride so that the desired doped tin oxide coating can be formed. Dopant-forming components which have excessively high boiling points and/or are excessively volatile (relative to stannous chloride), at the conditions employed in the present process, are not preferred since, for example, the final coating may not be sufficiently doped and/or a relatively large amount of the dopant-forming component or components may be lost during processing. It may be useful to include one or more property altering components, e.g., boiling point depressants, in the composition containing the dopant-forming component to be contacted with the substrate. Such property altering component or components are included in an amount effective to alter one or more properties, e.g., boiling point, of the dopant-forming component, e.g., to improve the compatibility or reduce the incompatibility between the dopant-forming component and stannous chloride.

Particularly useful anion dopants, particularly fluorine components for use in the present invention are selected from stannous fluoride, stannic fluoride, hydrogen fluoride, ammonium fluoride and mixtures thereof. When stannous fluoride is used as a fluorine component, it is preferred to use one or more boiling point depressants to reduce the apparent boiling point of the stannous fluoride, in particular to at least about 850° C. or less. The preferred dopants are those that provide for optimum dopant incorporation while minimizing dopant precursor losses, particularly under the preferred process conditions as set forth therein. In addition oxides or sub-oxides can also be used, including where dopant incorporation is accomplished during the oxidation sintering contacting step.

The use of a fluorine or fluoride dopant is an important feature of certain aspects of the present process and products of this invention. First, it has been found that fluorine dopants can be effectively and efficiently incorporated into the tin oxide-containing coating. In addition, such fluorine dopants act to provide tin oxide-containing coatings with good electronic properties referred to above, morphology and stability. This is in contrast to certain of the prior art which found antimony dopants to be ineffective to improve the electronic properties of tin oxide coatings in specific applications.

The liquid, e.g., molten, composition which includes stannous chloride may, and preferably does, also include the dopant-forming component. In this embodiment, the dopant-forming component or components are preferably soluble and/or dispersed homogeneously and/or atomized in the composition. Vaporous mixtures of stannous chloride and dopant-forming components may also be used. Such compositions are particularly effective since the amount of dopant in the final doped tin oxide coating can be controlled by controlling the make-up of the composition. In addition, both the stannous chloride and dopant-forming component are deposited on the substrate in one step. Moreover, if stannous fluoride and/or stannic fluoride are used, such fluorine components provide the dopant and are converted to tin oxide during the oxidizing agent/substrate contacting step. This enhances the overall utilization of the coating components in the present process. Particularly useful compositions comprise about 50% to about 98%, more preferably about 70% to about 95%, by weight of stannous chloride and about 2% to about 50%, more preferably about 5% to about 30%, by weight of fluorine component, in particular stannous fluoride.

In one embodiment, a vaporous stannous chloride composition is utilized to contact the substrate, and the composition is at a higher temperature than is the substrate. The make-up of the vaporous stannous chloride-containing composition is such that stannous chloride condensation occurs on the cooler substrate. If the dopant-forming component is present in the composition, it is preferred that such dopant-forming component also condense on the substrate. The amount of condensation can be controlled by controlling the chemical make-up of the vaporous composition and the temperature differential between the composition and the substrate. This "condensation" approach very effectively coats the substrate to the desired coating thickness without requiring that the substrate be subjected to numerous individual or separate contactings with the vaporous stannous chloride-containing composition. As noted above, previous vapor phase coating methods have often been handicapped in requiring that the substrate be repeatedly recontacted in order to get the desired coating thickness. The present "condensation" embodiment reduces or eliminates this problem.

The substrate including the stannous chloride-containing coating and the dopant-forming component-containing coating is contacted with an oxidizing agent at conditions effective to convert stannous chloride to tin oxide, preferably substantially tin dioxide, and form a doped tin oxide coating on at least a portion of the substrate. Water, e.g., in the form of a controlled amount of humidity, is preferably present during the coated substrate/oxidizing agent contacting. This is in contrast with certain prior tin oxide coating methods which are conducted under anhydrous conditions. The presence of water during this contacting has been found to provide a doped tin oxide coating having excellent electrical conductivity properties.

Any suitable oxidizing agent may be employed, provided that such agent functions as described herein. Preferably, the oxidizing agent (or mixtures of such agents) is substantially gaseous at the coated substrate/oxidizing agent contacting conditions. The oxidizing agent preferably includes reducible oxygen, i.e., oxygen which is reduced in oxidation state as a result of the coated substrate/oxidizing agent contacting. More preferably, the oxidizing agent comprises molecular oxygen, either alone or as a component of a gaseous mixture, e.g., air.

The substrate may be composed of any suitable material and may be in any suitable form. Preferably, the substrate is such so as to minimize or substantially eliminate deleterious substrate, coating reactions and/or the migration of ions and other species, if any, from the substrate to the tin oxide-containing coating which are deleterious to the functioning or performance of the coated substrate in a particular application. In addition, it can be precoated to minimize migration, for example an alumina and/or a silica precoat and/or to improve wetability and uniform distribution of the coating materials on the substrate. In order to provide for controlled and system designed electrical conductivity in the doped tin oxide coating, it is preferred that the substrate be substantially non-electronically conductive when the coated substrate is to be used as a component of a field dependent fluid. In one embodiment, the substrate is inorganic, for example glass and/or ceramic. Although the present process may be employed to coat two dimensional substrates, such as substantially flat surfaces, it has particular applicability in coating three dimensional substrates. Thus, the present process provides substantial process advances as a three dimensional process. Examples of three dimensional substrates which can be coated using the present process include spheres, such as having a diameter of from about 1 micron to about 500 microns more preferably from about 10 microns to about 150 microns, extrudates, flakes, single fibers, fiber rovings, chopped fibers, fiber mats, porous substrates, irregularly shaped particles, including catalyst supports, multi-channel monoliths, tubes, conduits and the like.

The conditions at which each of the steps of the present process occur are effective to obtain the desired result from each such step and to provide a substrate coated with a tin oxide-containing coating. The substrate/stannous chloride contacting and the substrate/dopant-forming component contacting preferably occur at a temperature in the range of about 250° C. to about 375° C., more preferably about 275° C. to about 350° C. The amount of time during which stannous chloride and/or dopant-forming component is being deposited on the substrate depends on a number of factors, for example, the desired thickness of the tin oxide-containing coating, the amounts of stannous chloride and dopant-forming component available for substrate contacting, the method by which the stannous chloride and dopant-forming component are contacted with the substrate and the like. Such amount of time is preferably in the range of about 0.5 minutes to about 20 minutes, more preferably about 1 minute to about 10 minutes.

If the coated substrate is maintained in a substantially non-deleterious oxidizing environment, as previously set forth, it is preferred that such maintaining occur at a temperature in the range of about 275° C. to about 375° C., more preferably about 300° C. to about 350° C. for a period of time in the range of about 0.1 minutes to about 20 minutes, more preferably about 1 minute to about 10 minutes. The coated substrate/oxidizing agent contacting preferably occurs at a temperature in the range of about 350° C. to about 600° C., more preferably about 400° C. to about 550° C., for a period of time in the range of about 0.1 minutes to about 10 minutes. A particular advantage of the process of this invention is the temperatures used for oxidation have been found to be lower, in certain cases, significantly lower, i.e., 50° to 100° C. than the temperatures required for spray hydrolysis. This is very significant and unexpected, provides for process efficiencies and reduces, and in some cases substantially eliminates, deleterious reactions and/or migration of deleterious elements from the substrate to the tin oxide layer. Excessive sodium migration, e.g., from the substrate, can reduce electronic conductivity.

The pressure existing or maintained during each of these steps may be independently selected from elevated pressures (relative to atmospheric pressure), atmospheric pressure, and reduced pressures (relative to atmospheric pressure). Slightly reduced pressures, e.g., less than atmospheric pressure and greater than about 8 psia and especially greater than about 11 psia, are preferred.

The tin oxide coated substrate, such as the fluorine doped tin oxide coated substrate, of the present invention may be, for example, a component of field dependent fluids.

In yet another embodiment, a coated substrate including tin oxide, preferably electronically conductive tin oxide, and at least one additional catalyst component in an amount effective to promote a chemical reaction is formed. Preferably, the additional catalyst component is a metal and/or a component of a metal effective to promote the chemical reaction. The promoting effect of the catalyst component may be enhanced by the presence of an electrical field or electrical current in proximity to the component. Thus, the tin oxide, preferably on a substantially non-electronically conductive substrate, e.g., a catalyst support, can provide an effective and efficient catalyst for chemical reactions, including those which occur or are enhanced when an electric field or current is applied in proximity to the catalyst component. Thus, it has been found that the present coated substrates are useful as active catalysts and supports for additional catalytic components. Without wishing to limit the invention to any particular theory of operation, it is believed that the outstanding stability, e.g., with respect to electronic properties and/or morphology and/or stability, of the present tin oxides plays an important role in making useful and effective catalyst materials, particularly the higher surface area attainable tin oxide materials prepared in accordance with this invention, especially when compared to prior art processes which produce very low surface areas. Any chemical reaction, including a chemical reaction the rate of which is enhanced by the presence of an electrical field or electrical current as described herein, may be promoted using the present catalyst component tin oxide-containing coated substrates. A particularly useful class of chemical reactions are those involving chemical oxidation or reduction. For example, an especially useful and novel chemical reduction includes the chemical reduction of nitrogen oxides, to minimize air pollution, with a reducing gas such as carbon monoxide, hydrogen and mixtures thereof and/or an electron transferring electrical field. A particularly useful chemical oxidation application is a combustion, particularly catalytic combustion, wherein the oxidizable compounds, i.e., carbon monoxide and hydrocarbons are combusted to carbon dioxide and water. For example, catalytic converters are used for the control of exhaust gases from internal combustion engines and are used to reduce carbon monoxide and hydrocarbons from such engines. Of course, other chemical reactions, e.g., hydrocarbon reforming, dehydrogenation, such as alkylaromatics to olefins and olefins to dienes, hydrodecyclization, isomerization, ammoxidation, such as with olefins, aldol condensations using aldehydes and carboxylic acids and the like, may be promoted using the present catalyst component, tin oxide-containing coated substrates. As noted above, it is preferred that the tin oxide in the catalyst component, tin oxide-containing substrates be electronically conductive. Although fluorine doped tin oxide is particularly useful, other dopants may be incorporated in the present catalyst materials to provide the tin oxide with the desired electronic properties. For example, antimony may be employed as a tin oxide dopant. Such other dopants may be incorporated into the final catalyst component, tin oxide-containing coated substrates using one or more processing techniques substantially analogous to procedures useful to incorporate fluorine dopant, e.g., as described herein.

Particularly useful chemical reactions as set forth above include the oxidative dehydrogenation of ethylbenzene to styrene and 1-butene to 1,3-butadiene; the ammoxidation of propylene to acrylonitrile; aldol condensation reactions for the production of unsaturated acids, i.e., formaldehyde and propionic acid to form methacrylic acid and formaldehyde and acetic acid to form acrylic acid; the isomerization of butenes; and the oxidation of methane to methanol. It is believed, without limiting the invention to any specific theory of operation, that the stability of the catalysts, the redox activity of the tin oxide, i.e., stannous, stannic, mixed tin oxide redox couple, morphology and the tin oxide catalytic and/or support interaction with other catalytic species provides for the making of useful and effective catalyst materials. In certain catalytic reactions, such as $NO_x$ reduction and oxidative dehydrogenation, it is believed that lattice oxygen from the regenerable tin oxide redox couple participates in the reactions.

The tin oxide-containing coated substrates of the present invention may be employed alone or as a catalyst and/or support in a sensor, in particular gas sensors. Preferably, the coated substrates includes a sensing component similar to the catalyst component, as described herein. The present sensors are useful to sense the presence or concentration of a component, e.g., a gaseous component, of interest in a medium, for example, hydrogen, carbon monoxide, methane and other alkanes, alcohols, aromatics, e.g., benzene, water, etc., e.g., by providing a signal in response to the presence or concentration of a component of interest, e.g., a gas of interest, in a medium. Such sensors are also useful where the signal provided is enhanced by the presence of an electrical field or current in proximity to the sensing component. The sensing component is preferably one or more metals or metallic containing sensing components, for example, platinum, palladium, silver and zinc. The signal provided may be the result of the component of interest itself impacting the sensing component and/or it may be the result of the component of interest being chemically reacted, e.g., oxidized or reduced, in the presence of the sensing component.

The stability and durability for the present tin oxide materials are believed to make them very useful as catalysts, sensors, and supports for additional catalysts and sensors in aggressive and/or harsh environments, particularly acid, i.e., sulfur and nitrogen acid environments.

Any suitable catalyst component (or sensing component) may be employed, provided that it functions as described herein. Among the useful metal catalytic components and metal sensing components are those selected from components of the transition metals, the rare earth metals, certain other catalytic components and mixtures thereof, in particular catalysts containing gold, silver, copper, vanadium, chromium, cobalt molybdenum, tungsten, zinc, indium, the platinum group metals, i.e., platinum, palladium and rhodium, iron, nickel, manganese, cesium, titanium, etc. Although metal containing compounds may be employed, it is preferred that the metal catalyst component (and/or metal sensing component) included with the coated substrate comprise elemental metal and/or metal in one or more active oxidized forms, for example, $Cr_2O_3$, $Ag_2O$, etc.

The preferred support materials include a wide variety of materials used to support catalytic species, particularly porous refractory inorganic oxides. These supports include, for example, alumina, silica, zirconia, magnesia, boria, phosphate, titania, ceria, thoria and the like, as well as multi-oxide type supports such as alumina-phosphorous oxide, silica alumina, zeolite modified inorganic oxides, e.g., silica alumina, and the like. As set forth above, support materials can be in many forms and shapes, especially porous shapes which are not flat surfaces, i.e., non line-of-site materials. A particularly useful catalyst support is a multi-channel monolith such as one made from cordierite which has been coated with alumina. The catalyst materials can be used as is or further processed such as by sintering of powered catalyst materials into larger aggregates. The aggregates can incorporate other powders, for example, other oxides, to form the aggregates.

As set forth above, the inorganic substrates, can include a wide variety of materials. Further examples of inorganic oxides for use in the manufacture of catalysts are for example, cordierite, silicon carbide, silicon nitride, titania (such as anatase), alumina (preferably gamma alumina), titania and silica, magnesium aluminate spinel, mordenite, i.e., zeolite, silica, magnesia and mixtures thereof. The inorganic substrates, particularly the inorganic oxide supports are particularly useful and can be coated with a tin oxide forming component and converted to a tin oxide.

The catalyst components (or sensing components) may be included with the coated substrate using any one or more of various techniques, e.g., conventional and well known techniques. For example, metal catalyst components (metal sensing components) can be included with the coated substrate by impregnation; electrochemical deposition; spray hydrolysis; deposition from a molten salt mixture; thermal decomposition of a metal compound or the like. The amount of catalyst component (or sensing component) included is sufficient to perform the desired catalytic (or sensing function), respectively, and varies from application to application. In one embodiment, the catalyst component (or sensing component) is incorporated while the tin oxide forming component is placed on the substrate. Thus, a catalyst material, such as a salt or acid, e.g., a halide and preferably chloride, oxy chloride and chloro acids, e.g., chloro platinic acid, of the catalytic metal, is incorporated into the stannous chloride-containing coating of the substrate, prior to contact with the oxidizing agent, as described herein. This catalyst material can be combined with the stannous chloride and contacted with the substrate, or it may be contacted with the substrate separately from stannous chloride before, during and/or after the stannous chloride/substrate contacting.

One approach is to incorporate catalyst-forming materials into a process step used to form a tin oxide coating. This minimizes the number of process steps but also, in certain cases, produces more effective catalysts. The choice of approach, however, is dependent on a number of factors, including the process compatibility of tin oxide and catalyst-forming materials under given process conditions and the overall process efficiency and catalyst effectiveness.

The catalyst support and/or tin oxide coated support can be coated with a material, such as a high surface area forming material, for example a wash coat in order to increase surface area. It is preferred to form a high surface area prior to incorporating the active catalyst material. Various conventional and well known techniques for catalyst incorporation can be used.

As set forth above, the catalyst support can be coated with materials to provide and/or enhance a particular property. In addition to surface area, coatings can also incorporate an active catalyst component. For example, zeolites can be coated on the surface of the catalyst support, using for example a silica binder generally in the range from about 10 to 40 wt % binder, more preferably from about 20 to about 30 wt % binder. The concentration of binder is selected to maximize the availability of zeolite sites and to preserve the integrity of the coating.

A wide variety of materials, for example, inorganic oxides, can be used in the manufacture of catalysts. As set forth above, it is preferred to reduce deleterious interactions between the substrate and the tin oxide coating on the substrate, i.e., a deleterious interaction which substantially reduces the conductivity and/or catalyst activity and/or activity maintenance for the particular application. In addition, it is preferred to reduce deleterious interactions between non-tin oxide coatings with the active catalyst component where such additional coatings are utilized in the preparation of the catalyst.

As set forth above, the catalysts can be contacted with a tin oxide precursor, utilizing for example powder, slurry, vapor infiltration and the like, process to produce a coated substrate. In a preferred embodiment, the tin oxide precursor is converted to tin oxide followed by incorporation of the catalyst component. The catalyst component can be incorporated directly on the tin oxide surface and/or a coating such as a high surface area coating, can be applied to the tin oxide surface coating, prior to incorporation of the active catalyst component. In general, it is preferred to have a high surface area available for catalyst incorporation and dispersion, particularly for high activity catalysts used in high gas velocity type conversion processes. The selection of a coating such as a coating on the tin oxide surface, is in part a function of the chemical process, the chemical processing conditions, to which the catalyst surface is exposed. For example, deleterious reactions between the catalyst and/or coating, i.e., the formation of low temperature spinels, from the catalyst component and for example alumina component can reduce significantly both catalyst activity and activity maintenance. Such coatings are selected to reduce such deleterious interactions between the catalyst and coating and/or tin oxide surface. However, certain catalyst coating interactions, enhance catalyst activity conversion and activity maintenance. Such interactions are generally referred to as catalyst support interactions and/or strong catalyst support interactions. Catalyst components, coatings, including tin oxide coating, can be selected to enhance such catalyst support interactions.

As set forth above, the support can be coated with a barrier type coating, prior to contacting with a tin oxide precursor and subsequent conversion to a tin oxide coating on the monolith. The barrier coat can reduce substantial deleterious substrate/tin oxide interaction, as well as, providing a definable surface, generally from a porosity stand point, to control and/or regulate the quantity of tin oxide precursor used to obtain a design average coating thickness, including reduced penetration into the pores of the catalyst. In addition, a coating can be formed on the tin oxide surface to provide for improved catalyst performance, i.e., higher surface area, more effective dispersion of catalyst, interactions between the coating and catalyst which improves catalysts performance, i.e., catalyst coating interactions which improve catalyst performance and/or reduce deleterious interactions which substantially reduce overall catalyst performance. As set forth above, the tin oxide and added catalyst metal can be formed with or without the use of a coating on the tin oxide surface, with the use of a subsequent coating, i.e., a high surface area coating being a preferred approach to incorporate catalyst forming materials. The tin oxide coating, catalyst combinations, as set forth above, are preferred catalyst products of the present invention.

As set forth above, the tin oxide substrate can be contacted with the catalyst forming material to incorporate the catalyst material after the conversion of the tin oxide precursor to tin oxide. As set forth above, various techniques, e.g., conventional and well known techniques can be utilized, i.e., impregnation and deposition from salt mixtures. For example, the tungsten and molybdenum can be incorporated as a catalyst by impregnation using ammonium salts dissolved in base. In addition, vanadium, i.e., ammonium vanadate dissolved in for example, a poly functional acid such as oxalic acid can be used. Metals such as cobalt, nickel, iron and copper can be impregnated as a nitrate solution. The impregnated supports are typically dried and sintered at elevated temperature for a time sufficient to decompose the salt to the corresponding oxide. Conventional and well known techniques can be utilized for metals such as the incorporation of precious metals as catalyst. As set forth above, a preferred impregnation technique for precious metal particularly, platinum is the use of chloro platinic acid. The impregnation or other techniques to incorporate a catalyst material after the formation of the tin oxide coating, is particularly preferred when the substrate is a multi-channel monolith.

The tin oxide/substrate combinations, e.g., the tin oxide coated substrates, of the present invention are useful in other applications as well. Among these other applications are included porous membranes, resistance heating elements, electrostatic dissipation elements, electromagnetic interference shielding elements, protective coatings, field dependent fluids and the like.

One particularly useful feature of the present porous membranes is the ability to control the amount of tin oxide present to provide for enhanced performance in a specific application, e.g., a specific contacting process. For example, the thickness of the tin oxide-containing coating can be controlled to provide such enhanced performance. The coating process of the present invention is particularly advantageous in providing such controlled coating thickness. Also, the thickness of the tin oxide-containing coating can be varied, e.g., over different areas of the same porous membrane, such as an asymmetric porous membrane. In fact, the thickness of this coating can effect the size, e.g., diameter, of the pores. The size of the pores of the membrane or porous substrate may vary inversely with the thickness of the coating. The coating process of the present invention is particularly useful in providing this porosity control.

A heating element, for example, a resistance heating element, is provided which comprises a three dimensional substrate having an electrically or electronically conductive tin oxide-containing coating on at least a portion of all three dimensions thereof. The coated substrate is adapted and structured to provide heat in response, that is, in direct or indirect response, to the presence or application of one or more force fields, for example, magnetic fields, electrical fields or potentials, combinations of such force fields and the like, therein or thereto. An example of such a heating element is one which is adapted and structured to provide heat upon the application of an electrical potential across the coated substrate. Heating elements which are adapted and structured to provide heat in response to the presence of one or more electrical currents and/or electrical fields and/or magnetic fields therein are included in the scope of the present invention. The heat may be generated resistively. In one embodiment, a flexible heating element is provided which comprises a flexible matrix material, e.g., an organic polymeric material in contact with a substrate having an electronically conductive tin oxide-containing coating on at least a portion thereof. The coated substrate is adapted and structured as described above.

In addition, an electrostatic dissipation/electromagnetic interference shielding element is provided which comprises a three dimensional substrate, e.g., an inorganic substrate, having an electronically conductive tin oxide-containing coating on at least a portion of all three dimensions thereof. The coated substrate is adapted and structured to provide at least one of the following: electrostatic dissipation and electromagnetic interference shielding.

A very useful application for the products of this invention is for static, for example, electrostatic, dissipation and shielding, particularly for ceramic and polymeric parts, and more particularly as a means for effecting static dissipation including controlled static charge and dissipation such as used in certain electro static painting processes and/or electric field absorption in parts, such as parts made of ceramics and polymers and the like, as described herein. The present products can be incorporated directly into the polymer or ceramic and/or a carrier such as a cured or uncured polymer based carrier or other liquid, as for example in the form of a liquid, paste, hot melt, film and the like. These product/carrier based materials can be directly applied to parts to be treated to improve overall performance effectiveness. A heating cycle is generally used to provide for product bonding to the parts. A particular unexpected advantage is the improved mechanical properties, especially compared to metallic additives which may compromise mechanical properties. In addition, the products of this invention can be used in molding processes to allow for enhanced static dissipation and/or shielding properties of polymeric resins relative to an article or device or part without such product or products, and/or to have a preferential distribution of the product or products at the surface of the part for greater volume effectiveness within the part.

The particular form of the products, i.e., fibers, flakes, particles, mats or the like, is chosen based upon the particular requirements of the part and its application, with one or more of flakes, fibers and particles, including spheres, being preferred for polymeric parts. In general, it is preferred that the products of the invention have a largest dimension, for example, the length of fiber or particle or side of a flake, of less than about $\frac{1}{8}$ inch, more preferably less than about 1/64 inch and still more preferably less than about 1/128 inch. It is preferred that the ratio of the longest dimension, for example, length, side or diameter, to the shortest dimension of the products of the present invention be in the range of about 500 to 1 to about 10 to 1, more preferably about 250 to 1 to about 25 to 1. The concentration of such product or products in the product/carrier and/or mix is preferably less than about 60 weight %, more preferably less than about 40 weight %, and still more preferably less than about 20 weight %. A particularly useful concentration is that which provides the desired performance while minimizing the concentration of product in the final article, device or part.

The products of this invention find particular advantage in static dissipation parts, for example, parts having a surface resistivity in the range of about $10^4$ ohms/square to about $10^{12}$ ohms/square. In addition, those parts generally requiring shielding to a surface resistivity in the range of about 1 ohm/square to about $10^5$ ohms/square and higher find a significant advantage for the above products due to their mechanical properties and overall improved polymer compatibility, for example, matrix bonding properties as compared to difficult to bond metal and carbon-based materials. A further advantage of the above products is their ability to provide static dissipation and/or shielding in adverse environments such as in corrosive water and/or electro galvanic environments. As noted above, the products have the ability to absorb as well as to reflect electro fields. The unique ability of the products to absorb allows parts to be designed which can minimize the amount of reflected electro fields that is given off by the part. This latter property is particularly important where the reflected fields can adversely affect performance of the part.

A flexible electrostatic dissipation/electromagnetic interference shielding element is also included in the scope of the present invention. This flexible element comprises a flexible matrix material, e.g., an organic polymeric material, in contact with a substrate having an electronically conductive tin oxide-containing coating on at least a portion thereof. The coated substrate of this flexible element is adapted and structured as described above.

The present coating process is particularly suitable for controlling the composition and structure of the coating on the substrate to enhance the performance of the coated substrate in a given, specific application, e.g., a specific resistance heating electrostatic dissipation or electromagnetic interference shielding application.

The porous membrane, in particular the substrate, can be predominately organic or inorganic, with an inorganic substrate being suitable for demanding process environments. The porous organic-containing membranes often include a porous organic based polymer matrix material having incorporated therein a three dimensional tin oxide-containing material, preferably including an electronically conductive tin dioxide coating, more preferably incorporating a dopant and/or a catalytic species in an amount that provides the desired function, particularly electrical conductivity, without substantially deleteriously affecting the properties of the organic polymer matrix material. These modified polymer membranes are particularly useful in porous membrane and/or electromembrane and/or catalytic processes.

Among the advantages of such membranes are: stability at high temperature and/or at large pressure gradients, mechanical stability reduced and even substantially no compaction of the membrane under pressure), stability against microbiological attack, chemical stability especially with organic solvents, steam sterilization at high temperatures, backflush cleaning at pressures of up to 25 atm, and stability in corrosive and oxidation environment.

As noted above, selectivity can be enhanced by applying an electrical field onto the surface of the membrane. The electrical field is obtained using a two electrode electrical device; the conductive membrane constituting one of the two electrodes (anode or cathode—preferably anode). Such porous membranes can be obtained with one or more electronically conductive tin oxide-containing thin layers on a porous substrate. Conductive tin oxide combined with other metal oxide mixtures also provide improved properties for porous membranes and exhibit electronic conductivity, as well as other functions, such as catalysts or resistance heating.

The products of this invention as described herein, are particularly useful for resistance heating applications. It has been found that the coated three dimensional and/or flexible substrates particularly fibers, fiber rovings, chopped fibers, and fiber mats, can be incorporated into polymeric matrix materials, particularly thermoplastic, thermoset and rubber based polymeric materials, as describe herein. The tin oxide coated substrates can be, for example, E, C, S, or T glass, silica, silica alumina, silica alumina boria, silicon carbide or alumina fibers, rovings, mats, chopped mats, etc. What is unexpected is the improved mechanical properties, e.g., strength coating adhesion and the like, of the coated substrates relative to the prior art substrates coated using spray pyrolysis techniques and the improved control over coating thickness to match conductivity requirements for a given resistance heating application. Whereas for many low to moderate temperature applications, organic polymer matrix materials are preferred, three dimensional products comprising, preferably primarily comprising flexible or rigid inorganic substrates coated with tin oxide-containing coatings have excellent high temperature performance characteristics useful, for example, in high temperature resistance heating of liquids and gases, such as air, by contact with or through (i.e., porous) such three dimensional products. Typical resistance heating applications include: heating elements or units of electric heating devices, devices for culinary purposes, warming tables, therapeutic heaters, deicing devices such as electrically heated polymer composites, low-temperature ovens such as driers, high temperature heating of gases, liquids, etc.

Another very useful application for the products of this invention is for the joining of parts, particularly polymeric parts, and as a means for effecting the sintering or curing of parts, such as ceramics, curable polymers, for example thermoset and rubber based polymers and the like. The products can be incorporated directly into the polymer or ceramic and/or a carrier such as a cured or uncured polymer based carrier or other liquid, as for example in the form of a liquid, paste, hot melt, film and the like. These product/carrier based materials can be directly applied to parts to be joined and resistance heating particularly induction heating used to raise the temperature and bond the parts together at a joint such as through polymer melting and/or curing. A particular unexpected advantage is the improved mechanical properties, especially compared to metallic susceptors which may compromise mechanical properties. In addition, the products of this invention can be used in molding processes to preferentially allow the rapid heating and curing of polymeric resins, and/or to have a preferential distribution of the products at the surface of the parts for subsequent joining of parts. The particular form of the products, i.e., fibers, spheres, flakes, particles, mats or the like, is chosen based upon the particular requirements of the part and its application, with one or more of flakes, fibers, spheres and particles being preferred for joining or bonding parts. In general, it is preferred that the products of the invention have a largest dimension, for example the length of a fiber or side of a flake, of less than about $\frac{1}{8}$ inch, more preferably less than about 1/64 inch and still more preferably less than about 1/128 inch. The concentration of such product or products in the product/carrier and/or mix is preferably less than about 50 weight %, more preferably less than about 20 weight %, and still more preferably less than about 10 weight %. A particularly useful concentration is that which provides the desired heating while minimizing the concentration of product in the final part.

Another unique application of the present invention combines the stability of the tin oxide containing coating, particularly at high temperatures and/or in demanding oxidizing environments, with the need to protect a structural element and/or to provide a fluid, i.e., gas and/or liquid, impervious material. Such structural elements are suitable for use at high temperatures, preferably greater than about 400° F., more preferably greater than about 1500° F. or even greater than about 2000° F. The present coatings preferably provide protection against oxidation. Examples of structural elements requiring such protection and/or a fluid impervious coating include three dimensional substantially carbon or inorganic materials, such as woven ceramic fibers and carbon-carbon composites, useful as turbine engine components, hot air frame components, and hypersonic vehicle structural elements or components. Due to the fact that carbon oxidizes under the demands of such environments, barrier or protective coatings are necessary. A particularly effective barrier coating is a tin oxide-containing coating formed according to the present invention because of the high temperature stability and excellent and complete coverage of such coating.

In addition, it is believed that a layer of at least one lower valence oxide of tin may form at the carbon tin oxide interface thereby giving additional barrier protection against excessive carbon oxidation to carbon oxides gases and decomposition products. The coating process of this invention, in addition, can uniformly coat three dimensional woven structures, particularly in the vaporous state, to effectively seal off diffusion of gases and/or liquids between surfaces. For example, ceramic fibers, such as those sold under the trademark Nextel by the 3M Company, can be woven into structures or structural elements, sealed off between surfaces, and used in high temperature applications. Such applications include gas and/or oil radiant and post combustion burner tubes, turbine engine components, and combustion chambers. For the latter, such structures can also contain one or more catalytically active materials that promote combustion, such as hydrocarbon combustions.

A particularly unique application that relies upon stable electronic conductivity and the physical durability of the products of this invention are dispersions of conductive material, such as powders, in fluids, e.g., water, hydrocarbons, e.g., mineral or synthetic oils, whereby an increase in viscosity, to even solidification, is obtained when an electrical field is applied to the system. These fluids are referred to as "field dependent" fluids which congeal and which can withstand forces of shear, tension and compression. These fluids revert to a liquid state when the electric field is turned off. Applications include dampening, e.g., shock absorbers, variable speed transmissions, clutch mechanisms, etc.

The products of this invention which are particularly useful for forming field dependent fluids are particulate as set forth above, particularly as powders. Such particulate can be for example, spheres, fibers, flakes and such other particulates, and powders. Typical examples of such tin oxide coated particles are the set forth above under catalysts resistance heating and electrostatic and EMI shielding particles. Such particles can have incorporated therein various dopants to modify conductivity and/or other components can be incorporated for a particular property, including various metal type components. In addition, various inorganic substrates are set forth above which substrates are particularly useful in producing the particles for use in field dependent fluids.

The coated substrate including the tin dioxide, preferably electrorheology electronically conductive tin dioxide, and/or optionally, electrorheology polarizable tin dioxide and/or at least one additional component in an amount effective to promote field dependent fluid performance, is particularly useful as field dependent fluids including electric and magnetic field dependence, particularly electric field. Preferably the additional component is a polarizable component or conductivity modified in an amount effective to promote such fluid performance. Thus the promoting effect of the component may be enhanced by the presence of an electrical field in proximity to the component/particle. Thus, the tin dioxide, preferably on a substantially non-electronically conductive substrate, e.g., a particle, can provide an effective and efficient electric field dependent fluid, including those which occur or are enhanced when an electric field is applied in proximity to the particle. Thus, it has been found that the presently coated substrates are useful as active electrorheological fluid enhancers and as a base modified by additional components that still further enhance electrorheological fluid properties. Without wishing to limit the invention to any particular theory of operation, it is believed that the outstanding stability, e.g., with respect to electronic properties and/or morphology and/or stability, of the present tin oxides plays an important role in making useful and effective field dependent particles, particularly the higher surface area attainable tin dioxide particles, particularly when prepared in accordance with this invention.

As noted above, it is preferred that the tin oxide particle, tin oxide-containing substrates be electronically conductive and/or polarizable. Although fluorine doped tin oxide is particularly useful, other dopants may be incorporated in the present particle to provide the tin oxide with the desired electronic and/or polarizable properties. For example, antimony may be employed as a tin oxide dopant. Such other dopants may be incorporated into the final particle, tin oxide-containing coated substrates using one or more processing techniques substantially analogous to procedures useful to incorporate fluorine dopant, e.g., as described herein.

As set forth above, the tin dioxide particles is present in the fluid in the amount to enhance the field dependent fluid performance. In addition the conductivity and/or reciprocal resistivity of the tin dioxide particle is of a value which promotes the overall performance of the field dependent fluid, i.e., enhances eletrorheological properties of the fluid. Typically the resistivity of the tin dioxide particle is within the range from about $10^{-3}$ to about $10^9$ ohm cm, more preferably from about $10^1$ to about $10^3$ ohm cm and still more preferably, from about 10 ohm cm to about $10^2$ ohm cm. The conductivity of the tin dioxide particle can be controlled by the type of dopant, the concentration of dopant, the processing conditions in order to obtain a resistivity within the preferred ranges as set forth above and with improved electrorheological modifying properties. In addition to the above modifications to obtain a given conductivity other components can be incorporated into the tin oxide coating such as a moderate to high resistance type of material such as silica which produces a tin dioxide coating having optimized eletrorheological properties.

In addition to electrical conductivity as set forth above, the polarizability of the tin dioxide coating can be modified through the addition of a component such as to enhance the overall polarizability of the tin dioxide particle which enhanced polarizability can improve the overall electrorheological properties of the fluid. For example, the tin dioxide coating can be modified to form surface hydrates which are responsive to electric fields and produce a reversible change in eletrorheological properties. Other components, particularly polar components, more particularly organic polar components such as surface active agents, alkanol amines such as low molecular weight alkanol amines, alkyl amines and water can in addition be used as polarization components. Such additional components which alter the polarization properties of the tin dioxide coating and can produce field dependent fluids which are useful at elevated temperatures, including for certain fluids use above 70° C. or even above 100° C.

The stability and durability for the present tin oxide materials are believed to make them very useful in field dependent fluids in more aggressive and/or more harsh environments, particularly high temperature, and/or pressure and/or oxidation environments.

Certain metal components associated with the tin oxide particle may be employed, provided that they function to enhance electrorheological properties and/or an application defined property. Among the useful metal components are those selected from components of the transition metals, the rare earth metals, certain other components and mixtures thereof, in particular, gold, silver, copper, vanadium, chromium, cobalt molybdenum, tungsten zinc, indium, the platinum group metals, i.e., platinum, palladium and thorium, iron, nickel, manganese, cesium, titanium, etc. Although metal containing compounds may be employed, it is preferred that the metal components included with the coated substrate comprise elemental metal and/or metal in one or more active oxidized forms, for example, $Cr_2O_3$, $Ag_2O$, etc.

The preferred substrate materials include a wide variety of inorganic materials including high surface area materials, particularly inorganic oxides and carbon as set forth above, particularly under the catalysts resistance heating and shielding products of this invention. Additional substrates include for example, alumina, silica, zirconia, magnesia, boria, phosphate, titania, ceria, thoria and the like, as well as multi-oxide type supports such as alumina-phosphorous oxide, silica alumina, zeolites, zeolite modified inorganic oxides, e.g., silica alumina and the like. As set forth above, substrate particle materials can be in many forms and shapes, especially shapes which are not flat surfaces, i.e., non line-of-site particulate materials and particularly, spheres. The substrate can be used as is or further processed such as by sintering of powered materials into large aggregates. The aggregates can incorporate other powders, for example, other oxides, to form the aggregates.

As set forth above, the particles include for example, spheres, fibers, flakes, other irregularly shaped geometry such as aggregates and alike. In general the particle size can vary over a wide range, typically a particle size maximum width of from about 0.04 microns up to a width representing about 10% of the design gap between electrodes which form the electric field means associated with the use of the field dependent fluid. More preferably, the range of the width of the particle is from about 1 to about 100 microns still more preferably, from about 5 to about 50 microns. The width of the particles can be adjusted to provide various degrees of packing densities in the fluid which packing densities can include a bi-modal type of distribution of particle sizes.

It is preferred that the particles comprise a majority of mono particles, more preferably, a predominant proportion. The use of mono particles reduces the tendency of the particles to sheer down to smaller size particles which shear down may accompany the use of particle aggregates in field dependent fluids. In addition, it is preferred to have a particle aspect ratio, i.e., the maximum particle width divided by the minimum particle width of less than about 20 to 1, still more preferably less than about 10 to 1 and still more preferably, less than about 5 to 1. One of the preferred shapes is spheres wherein the aspect ratio approaches 1 and/or is 1. In practice the spherical particles which are preferred for use in the composition of this invention, have a roundness associated with such particles generally greater than about 70%, still more preferably greater than about 85% and still more preferably, greater than about 95%.

As set forth above, a particularly preferred particle is a spherical particle, particularly spheres within the particle size and roundness ranges set forth above. The spheres can improve overall field dependent fluid performance, particularly in reducing adverse particle effects on the fluid such as dielectric breakdown. A particularly unique embodiment of the present invention is the use of hollow spheres, particularly within the particle size and roundness ranges as set forth above. Such spheres are hollow i.e. contain one or more closed cell voids hereinafter referred to as hollow spheres and are designed to be density compatible with the fluid. The density compatible hollow spheres have a density in the range of from about 60% to about 140% of the density of the fluid, more preferably from about 70% to about 130% of the density of the fluid, still more preferably from about 80% to about 120% of the density of the fluid and still more preferably, from about 90% to about 110% of the density of the fluid. Thus, for example, the density of the fluid can vary according to the type of fluid utilized in the field dependent fluid, such as from about 0.95 g per cc up to about 1.95 g per cc for certain chlorinated aromatic fluids. The density compatibility of the hollow spheres relates to the particular fluid, including blends of fluids utilized as the field dependent fluid. The density compatibility provides improved stability of the hollow spheres particulate in the fluid, particularly where settling out the particles can adversely effect overall performance of the field dependent fluids and/or where such sedimentation can cause premature failure of the device.

As set forth above, the spheres can be inorganic and for example, carbon and/or inorganic oxide. The preferred inorganic oxides can be for example alumino silicates, silica, sodium borosilicate, insoluble glass, soda lime glass, soda lime borosilicate glass, silica alumina, as well as such glasses and ceramics, modified with titanium dioxide and/or small amounts of iron oxide. The density of the hollow spheres can be designed to be density compatible with the fluid by the density of the inorganic material itself, the hollow and or void volume and the thickness of the wall and the density of surface component on the sphere. For a hollow sphere the aspect ratio, i.e., the diameter of the sphere divided by the thickness of the wall, in part defines both the density of the hollow sphere, as well as the buckling pressure of the sphere. Thus as the aspect ratio decreases, the density of the hollow sphere increases and in general, the crush strength of the hollow sphere increases. Of additional significance is the ability of the hollow sphere under high sheer conditions to provide improved mechanical stability, particularly at aspect ratios which provide the requisite wall thickness and density compatibility. Thus for example, hollow spheres for use in field dependent fluids can be designed for density compatibility at high crush strengths and sheer rates, for example, less than about 20% and even less than about 10% breakage at isostatic pressures of greater than 6,000 psi, even up to about 60,000 psi.

As set forth above, the unique hollow spheres having fluid density compatibility can be coated with tin dioxide including such additional components as set forth above. In addition, it has been found that the fluid density designed particles can improve the overall performance of materials that have been shown to exhibit an electrorheological effect. Thus for example, fluid density compatible hollow spheres can have an electronically conductive and/or polarizable surface component associated therewith, including components which are incorporated during the processing to produce such fluid density compatible materials. For example, alumino silicates, organic polyelectrolytes, organic polyampholytes, organic semiconductors, water, polar organic compounds such as alcohols, amines, amides, polyhydroxy organic compounds and various other surfactant materials which provide a polarizable effect on the surface can be incorporated on the surface of the hollow sphere.

The surface area can be optimized for the tin oxide coating and/or other components, and/or other conductivity and/or polarizable components, by the selection of starting materials, porosity forming components and their concentration and geometry. Such optimization also takes into consideration the final end use application of the substrate. Porosity can also be increased by directly leaching the preformed substrate within an acid medium, i.e., nitric acid, to selectively remove for example ceramic constituents for example magnesia and alumina. Such leaching cannot only increase porosity but also the surface areas of the substrate. Typical substrate surface areas can range from about 0.1 to about 2 meters square per gram up to about 20 or even up to about 40 or higher meters square per gram, with the higher areas generally resulting from leached and/or coated substrates.

It is generally preferred to have a high surface area in order to optimize activity for a particular application. As set forth above, the surface area can be increased by, for example. leaching and/or by the application of a surface coating such as a wash-coat which provides for a high surface area surface on the substrate. It is preferred to incorporate other active components as set forth above on a high surface area for improved overall effectiveness and activity. As set forth above, it is preferred to have macro pores when a subsequent surface coat is being applied to the substrate. Such subsequent coatings can include, for example, a barrier coat, a wash coat, and/or the tin oxide coating on the substrate surface.

Other active components may be included with the coated substrate and/or substrate using any one or more of various techniques, e.g., conventional and well known techniques. For example, metal can be included with the coated substrate by impregnation; electrochemical deposition; spray hydrolysis; deposition from a molten salt mixture; thermal decomposition of a metal compound or the like. The amount of a component included is sufficient to perform the desired functions, and varies from application to application.

The fluids, to which the tin dioxide coated particles and hollow sphere particle of this invention are added to provide the field dependent compositions of this invention, hereinafter referred to as fluids, include, but are not limited to esters and amides of an acid of phosphorus, hydrocarbon materials including both hydrocarbon materials derived from petroleum sources and synthetic hydrocarbon oils, hydrocarbyl silicates, silicones, ether compounds which include polyphenyl ether compounds, polyphenyl thioether compounds mixed polyphenyl ether-thioether compounds, phenoxybiphenyl compounds, phenylmercaptobiphenyl compounds, mixed phenoxyphenylmercaptobiphenyl compounds and the above ether compounds in which part of all of the phenyl and phenylene rings are replaced with a heterocyclie group such as thiophene or pyridene, mono- and di alkythiophenes, chlorinated aromatics, i.e., chlorinated biphenyl, monoesters, di- and tricarboxylic acid esters, esters of polyhydric compounds, complex esters and mixtures thereof.

The concentration of particles in the fluid is adjusted in terms of the particular system and the fluid which is utilized in this system to provide fluid compositions of this invention which contains amounts of tin dioxide particles sufficient to provide an electro-rheology fluid modification. Thus, it has been found that the response, that is, the particle concentration required in a fluid varies according to the type of fluids or blends of base fluids. Thus, for the compositions of this invention the particle concentration to is from about 5 volume percent to about 50 volume percent, the particular concentration being that amount which will effectively provide an electrorheology fluid modification. The preferred concentration is from about 15 volume percent to about 40 volume percent more preferably from about 20 to about 40 volume percent, although about 10 volume percent to about 45 volume percent have been found satisfactory and effective to provide an electrorheology fluid modification. Therefore, included within the present invention are compositions comprising a fluid and a electrorheoloty modifying amount of a particle that is to is added in a concentration sufficient to provide such modification. The fluid compositions of this invention can be compounded in any manner known to those skilled in the art for the incorporation of particles into a fluid as for example by adding heavy water to the base stock with stirring until a uniform fluid composition is obtained.

The esters and amides of an acid of phosphorus which are suitable for use in the fluid compositions of this invention are those represented by the structure

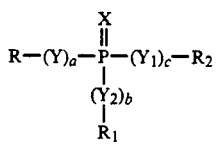

where Y is selected from the group consisting of oxygen sulfur and

$Y_1$ is selected from the group consisting of oxygen, sulfur and

and $Y_2$ is selected from the group consisting of oxygen, sulfur and

$R$, $R_1$, $R_2$, $R_3$, $R_4$, and $R_5$, are each selected from the group consisting of alkyl, aryl, substituted aryl and substituted alkyl wherein $R$, $R_1$, $R_2$, $R_3$, $R_4$, and $R_5$ each can be identical or different with respect to any other radical, X is selected from the group consisting of sulfur and oxygen and a, b and c are whole numbers having a value of 0 to 1 and the sum of a+b+c is from 1 to 3.

Typical examples of alkyl radicals are as follows: methyl, ethyl, normal propyl, isopropyl, normal butyl, isobutyl, secondary butyl, tertiary butyl, normal amyl, isoamyl, 2-menthybutyl, 2,2-dimethyl propyl, 1-methyl butyl, diethyl methyl, 1,2-dimethyl propyl, tertiary amyl, normal hexyl, 1-methylamyl, 1-ethyl butyl, 1,2,2-trimethyl propyl, 3,3-dimethyl butyl, 1,1,2-trimethyl propyl, 2-methyl amyl, 1,1 dimetyl butyl, 1-ethyl 2-menthyl propyl, 1,3 -dimethyl butyl, isoheyl, 3-methylamyl, 1,2-dimethyl butyl, 1-methyl 1-ethyl propyl, 2-tethyl butyl, normal heptyl 1 1,1,2,3-tetramethyl propyl, 1,2-dimetheyl 1-ethyl prophyl, 1,1,2-trimethyl butyl, 1-isopropyl 2-methyl propyl, 1-methyl 2-ethyl butyl, 1,1-diethyl propyl, 2-methyl hexyl, 1,1-dimethyl amyl, 1-isopropyl butyl, 1-ethyl 3-methyl butyl, 1,4-dimethyl amyl, isoheptyl, 1-methyl 1-ethyl butyl 1-ethyl 2-methyl butyl, 1-methyl hexyl, 1-propyl butyl, normal octyl, 1-methyl hepyl, 1,1-ciethyl 2-methyl propyl, 1,1,3,3-tetramentyl butyl, 1,1-diethyl butyl, 1,1 dimethyl hexyl, 1-methyl 1-ethyl amyl, 1-methyl 1-propyl butyl, 2-ethylhexyl 6-methyl heptyl (iso-octyl), normal nonyl, 1-methyl octyl, 1-ethyl heptyl, 1,1-dimethyl heptyl, 1-ethyl 1-propyl butyl, 1,1-diethyl 3-methyl butyl, diisobutyl methyl, 2,5,5-trimethyl hexyl, 3,5-dimethyl hepyl, normal decyl 1-propyl heptyl, 1,1-diethyl hexyl, 1,1-dipropyl butyl, 2-isopropyl 5-methyl hecyl and $C_{11-18}$alkyl groups.

It is also contemplated within the scope of this invention that all or part of the hydrogen other than hydrogen occupying the one position in the previously described alkyl radicals can be replaced by halogens, such a fluorine, chloride or bromide.

It is also contemplated that the above alkyl and halogenated alkyl groups can have oxa linkages linking any two carbon atoms contained in the alkyl and halogenated alkyl groups.

Typical examples of aryl and substituted aryl radicals are phenyl, cresyl, xylyl, halogenated phenyl, cresyl and xylyl in which available hydrogen on the aryl or substituted aryl is partially or totally replaced by a halogen o-, m- and p-trifluoromethylphenyl, o-, m- and p-2,2,2-triflroroethylphenyl, o-, m- and p-3,3,3-trifluoropropylphenyl and o-, m- and p-4,4,4-trifluorobutylphenyl.

The preferred esters of an acid of phosphorus are those fluids wherein a, b, and c have a value of 1, Y, $Y_1$ and $Y_2$ are oxygen and R, $R_1$ and $R_2$ are alkyl, aryl or substituted aryl. Typical examples of these esters of an acid of phosphorus, that is phosphates, are dibutylphenyl phosphate, triphenyl phosphate, tricresyl phosphate, tributyl phosphate, tri-2-ethylhexyl phosphate, tri-octyl phosphate and mixture of the above phosphates, such as mixtures of tributyl phosphate and tricresyl phosphate, and mixtures of isooctyldiphenyl phosphate and 2-ethylhexyldiphenyl phosphate and mixtures of trialkyl phosphates and tricresyl phosphates and the like.

The preferred amides of an acid of phosphorus are those wherein j, k and 1 have a value of 1 and K, $Y_1$ and $Y_2$ are selected from oxygen and

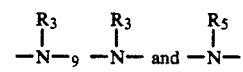

respectively. Typical examples of the amides of an acid of phosphorus, that is, mono-, di- and trimides of an acid of phosphorus hereinafter defined as phosphoroamidates, are phenyl-methyl-N, N-dimethyl-phosphoroamidate; phenyl-methyl-N, N-di-n-butylphosphoroamidate; mixtures of phenyl-m-cresyl-N, N-dimethylphosphoroamidate and phenyl-p-cresyl-N, N-dimethylphosphoroamidate; di-m-bromophenyl-N-methyl-N-n-butylphsphoroamidate; di-m-chlorophenyl-N-methyl-N-n-butylphosphoroamidate; di-a,a,a,-trifluoro-m-cresyl-N-methyl-N-n-butyl-phosphoroamidate; di-p-bromophenyl-N-methyl-N-n-isoamyylphosphoroamidate; p-chlorophenyl-m-bromophenyl-N-methyl-N-n-isoamyl-phosphoroamidate; phenyl-N-methyl-N-butyl-N'-methyl-N-n-isoamyl-phosphoroamidate; phenyl-N-N-di-n-butyl-N, N'-di-n-butylphosphorodiamidate; phenyl-N, N-dimethyl-N', N'-dimethylphosphorodiamidate; m-chlorophenyl-N-methyl-N-n-butyl-N'-methyl-N'-n-butylphosphorodiamidate;m-bromophenyl-N-methyl-N-methyl-N-n-butyl-N'-methyl-N'-n-butylphosphorodiamidate;a,a,a-trifluoro-m-cresyl-N-methyl -N-n-butyl-n"-methyl-n-butylphosphorodiamidate; p-chlorophenyl-N-methyl-N-isobutyl-N'-methyl-N'-isoamylphosphorodiamidate; p-bromophenyl-N-methyl-N-isobutyl-N'-methyl-N'-isoamylphosphorodiamidate; N-methyl-N-butyl-N'-methyl-N'-butyl -N"-methyl-N"'-butylphosphorotriamidate;N-methyl-N-butyl-N', N"'-tetramethyl-phosphorotriamidate;N-di-n-propyl-N'-N'-tetramethylphosphorotriamidate; and N,N'-di-n-propyl-N"'-dimethylphosphoorotriamidate.

Typical examples of phosphinate esters are phenyl-di-n-propyl phosphinate, phenyl-di-n-butyl phosphinate, phenyl-di-sec-butyl phosphinate, phenyl-di-n-pentryl phosphinate, phenyl-di-neopentyl phosphinate, phenyl-di-n-hexyl phosphinate, phenyl-di-n-butyl thiophosphinate, p-methoxyphenyl-di-n-butyl phosphinate, m-chlorophenyl-di-n-butyl phosphinate, phenyl-(n-propyl-n-pentyl) phosphinate, phenyl-(n-propyl-n-butyl) phosphinate, phenyl-(n-propyl-n-hexyl) phosphinate, phenyl-(n-pentyl-n- hexyl) phosphinate, phenyl-(neopentyl-n-butyl) phosphinate, phenyl-(neo pentyl-n-hexyl) phosphinate, thiophenyl-di-n-propyl phosphinate, thiophenyl-di-n-pentyl phosphinate, cresyl -di-n-pentyl phosphinate, tert-butylphenyl-di-n-butyl phosphinate, n-butyl-phenyl-di-n-butyl phosphinate, ethyl-phenyl-di-n-butyl phosphinate, xylyl-di-n-butyl phosphinate, thiophenyl-di-n-hexyl phosphinate, thiophenyl-di-n-butyl phosphinate, thiophenyl-di-n-propyl thiophosphinate, thiophenyl-di-n-butyl thiophosphinate, thiophenyl-di-n-pentyl thiophosphinate, thiophenyl-di-n-hexyl thiophosphinate, thiophenyl-(n-propyl-n-butyl) phosphinate, tiophenyl-(propyl-n-pentyl) phosphinate, thiophenyl-(n-butyl-n-hexyl) phosphinate, thiophenyl(n-pentyl-n-hexyl) phosphinate, thiophenyl-(n-propyl-n-butyl) thiophosphinate, thiophenyl-(n-propyl-n-pentyl) thiophosphinate, thiophenyl-(n-propyl-n-hexyl) thiophosphinate, thiophenyl-(m-butyl-n-pentyl) thiophosphinate, thiophenyl-(n-butyl-n-hexyl) thiophosphinate and thiophenyl-(n-pentyl-n-hexyl) thiophosphinate.

The orthosillicates useful as fluids include the tetraalkyl orthosilicates such as tetra(octyl)orthosilicates, tetra(2-ethylhexyl)orthosilicates and the tetra(isooctyl) orthosilicates and those in which the isooctyl radicals are obtained from isooctyl alcohol which is derived from the oxo process, and the (trialkoxysilico) trialkyl orthosilicates, otherwise referred to as hexa(alkoxy) disiloxanes, such as hexa(2-ethylbutoxy) disiloxane and hexa(2-ethylhexoxy) disiloxane.

The preferred teraalkyl orthosilicates and hexa(alkoxy) disioxanes are those in which the alkyl or alkoxy radicals have from 4 to 12 carbon atoms and in which the total number of carbon atoms in the orthosilicate is from 16 to 60.

In addition to the hexa(alkoxy) disiloxanes can be used in which the aliphatic radical of the alloy groups are for example, 1-ethylpropyl, 1,3-dimethylbutyl, 2-methyl-pentyl, 1-methylhexyl, 1-ethylpentul, 2-butylhexyl and 1-methyl-4-ethyloctyl.

The orthosilicates and alkoxy polysiloxanes can be represented by the general structure

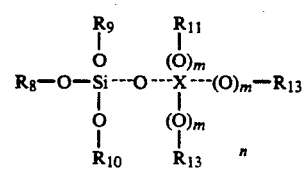

wherein $R_8$, $R_9$, $R_{10}$ each can be alkyl, substituted akyl, aryl, substituted aryl can be identical or different with respect to any other radical, O is oxygen, Si is silicon, X is a member of the group consisting of carbon and silicon, m is a whole number having a value of 0 to 1, n is an integer having a value of from 1 to about 200 or more and when X is carbon m is 0, n is 1 and $R_{11}$, $R_{12}$, $R_{13}$, each can be hydrogen, alkyl, substituted alkyl, aryl and substituted aryl radicals and when X is silicon m is 1, n is an integer having a value of from 1 to about 200 or more and $R_{11}$, $R_{12}$, $R_{13}$, each can be alkyl, substituted alkyl, aryl and substituted aryl.

Typical examples of substituted aryl radicals are o-, m- and p-chlorophenyl, o-, m- and p-bromophenyl, o-, m- and p-fluorophenyl, a,a,a-trichlorocresyl, a,a,a-trifluorocresyl, xylyl and o-, m- and p-cresyl. Typical examples of alkyl and haloalkyl radicals are those heretofore described.

The siloxanes or silicones useful as fluids are represented by the general structure

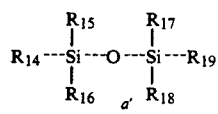

wherein $R_{14}$, $R_{15}$, $R_{16}$, $R_{17}$, $R_{18}$, $R_{19}$, can each be alkyl, substituted alkyl, aryl and substituted aryl radicals and n' is a whole number from about 0 to about 2000 or more. Typical examples of alkyl and haloalkyl radicals are those heretofore described. Typical examples of the siloxanes are poly(methyl) siloxane, poly(methyl, phenyl) siloxane, poly (methyl, chlorophenyl)siloxane and poly(methyl,3,3,3-trifluoropropyl)siloxane.

Typical examples of substitute aryl radicals and o-, m- and p-bromophenyl, o-, m- and p-fluorophenyl, a,a,a-trichlorocresyl, a,a,a-trifluorocresyl, o-, m- and p-cresyl and xylyl.

Di- and tricarboxylic acid esters which are suitable as fluids are represented by the structure

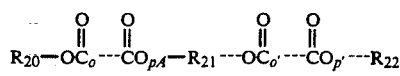

wherein o, o', p and p' each are whole numbers having the value of 0 to 1 provided that the sum of each of o+p and o'+p' is 1; A is a whole number having a value of 1 to 2; $R_{20}$ and $R_{22}$ each can be alkyl, cycloalkyl, substituted alkyl, alkenyl, substituted alkenyl, aralkyl, substituted aralkyl, aryl and substituted aryl; and $R_{21}$ can be a hydrocarbon radical and substituted hydrocarbon radical. Typical examples of alkyl, aryl, substituted alkyl and substituted aryl radicals are given above.

Typical examples of di- and tricarboxylic acid esters are di(2-ethylhexyl) azelate, di(2-ethylhexyl) sebacate, dissooctyl sebacate, 2-ethylhexyl 3:5:5 timethylhexyl sebacate, diisooctyl azelate, di(3:5:5 trimethylhexyl) sebacate, di(1-methyl-4-ethyloctyl) sebacate, diisodecyl azelate, dissotridecyl azelate, di(1-methyl-4-ethyloctyl) glutarate, di(2-ethylhexyl) aipate, di(3-methylbutyl) azelate, di(3:5:5 trimethyl hexyl) azelate, di(2-ethylhexyl)adipate, di($C_{10}$oxo) adipate, bis(diethylene glycol moonobutyl ether) adipate, di(isooctyl/isodecyl) adipate, diisotridecyl adipate, triethylene glycol di(2-ethylhexanoate), hexanediol1,6-di(2-ethylhexanoate) and dipropylene glycol dipelargonate. Additional examples are mixtures of esters made from an aliphatic dibasic acid and a technical mixtures of alcohols such as a mixture of alcohols obtained by the oxo process.

Polyesters which are suitable as fluids are represented by the structure

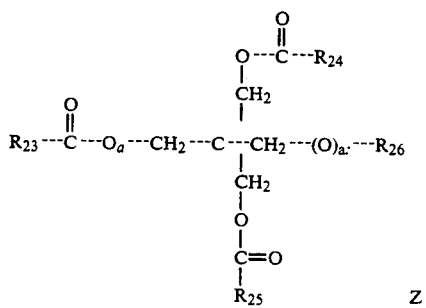

wherein $R_{23}$ is selected from the group consisting of hydrogen and alkyl, $R_{24}$, $R_{25}$ are each selected from the group consisting of alkyl, substituted alkyl, cyclo alkyl, aralkyl, aryl and substituted aryl, a is a whole number having a value of 0 to 1, a', is a whole number having a value of 0 to 1, Z is a whole number having a value of 1 to 4 and when Z is 1 a' is 0 and $R_{26}$ is selected from the group consisting of acyloxy and substituted acyloxy and when Z is 2 to 4 a' is 1 and $R_8$ is selected from the group consisting of acyl and substituted acyl.

Typical polyester compounds can be prepared by the reaction of acid compound with a polyhydroxy compound with polyhydroxy compound which polyhydroxy compound can be trimethylolpropane, trimethylolethane, pentaerythritol, dipentaerythritol, tripentaerythritol and tetrapentaerythritol.

The acids which may be utilized are aliphatic monocarboxylic acids, alicyclic monocarboxylic acids, aramatic monocarboxylic acids and heterocyclic monocarboxylic acids, such as propionic, butyric, isobutyric, n-valeric, cproix, n-hepytilc, caprylic, 2-ethylhexanoic, 2,2-dimethylheptanooic and pelargonic. Examples of esters of this type are esters of trimethyllpropane (1 mole) with monocarboylic acids (3 moles), e.g., trimethlolpropane tri-n-octanoate; ester of pentaerythritol (1 mole) with monocarboxylic acids (4 moles); esters of di- or tripentaerythritol (1 mole) with monocarboxylic acids (6 or 8 moles). Typical examples of alkyl, substituted alkyl, aryl and substituted aryl radicals are given above.

Other esters which are also suitable as fluids are hydrocarbon monoesters containing one ester group, typical examples of which are isooctyl stearate and 2-ethylhexyl octoate.

Complex esters which are suitable as fluids are represented by the structure

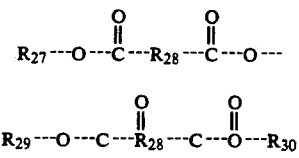

wherein $R_{27}$ and $R_{30}$ are each selected from the group consisting of hydrogen, alkyl, substituted alkyl, alkenyl, substituted alkenyl, aryl, substituted aryl, cycloalkyl, substituted cycloalkyl and a carbocyclic radical containing from 6 to 10 carbon atoms; $R_{28}$ and $R_{29}$ are each selected from the group consisting of alkylene, substituted alkylene, alkenylene, substituted alkenylene, phenylene and substituted phenylene, x is a whole number having a value from 1 to about 80.

Typical examples of complex esters can be obtained by esterifying dicarboxylilc acids with a mixture of monohydric alcohol and a glycol to give complex esters. Complex esters which can be employed can be prepared by esterifying a dicarboxylic acid (1 mole) with a glycol (2 moles) and a monocarboxylic acid (2 moles) or with 1 mole each of a glycol, a dicarboxylic acid and a monohydric alcohol or with 2 moles each of a monohydroxy monocarboxylic acid and a monohydric alcohol. Still other complex esters may be prepared by esterifying a glycol (1 mole) with a monohydroxy minocarboxylic acid (2 moles) and a monocarboxylic acid (2 moles).

Other complex esters which are suitable as fluids are prepared by polymerizing a dihydroxy compound with a dicarboxylic acid and reacting the terminal hydroxy and acid radical with a mixture of a monocarboxylic acid and a monohydric alcohol. Specific examples of polymers which may be utilized as additives within the scope of this invention are polymers prepared by the polymerization of adipic acid and 1,2-propane diol in the presence of minor amounts of short-chain monocarboxylic acids and monohydric alcohol to give molecular weights of the polymers thereby produced of from about 700 to about 40,000 or higher.

The mono-, di- and polydyric alcohols and the monocarboxylic acids employed in the preparation of the complex esters can also contain other oxygen linkages.

Specific examples of suitable complex esters are esters prepared from methylene glycol (1 mole), adipic acid (2 moles) and 2-ehtylhexanol (2 moles); ester prepared from tetraethlene glycol (1 mole), sebacic acids (2 moles) sand 2-ethylhexanol (2 moles); esters prepared from 2-ethyl-1:3 hexanediol (1 mole), sebacic acid (2 moles) and 2-ethylhexanol (2 moles); esters prepared from diethylene glycol (1 mole), adipic acid (2 moles) and n-butanol (2 moles);esters prepared from polyglycol 200 (1 mole), sebacic acid (2 moles) and ethylene glycol mono(2-ethylbutyl) ether (2 moles); esters prepared from sebacic acid (1 mole), tetraethylene glycol (2 moles) and caproic acid (2 moles); esters prepared from triethylene glycol (1 mole) and 2-ethylhexanol (1 mole); esters prepared from sebacic acid (1 mole), tetrethylene glycol (2 moles) and caproic acid (2 moles); esters prepared from triethy- lene glycol (1 mole) adipic acid (1 mole), n-caproic acid (1 mole) and 2-ethyhexanol (1 mole);ester prepared from sebacic acid (1 mole), lactic acid ester prepared from sebacic acid (1 mole), lactic acid (2 moles) and n-butanol (2 moles); esters prepared from tetraethylene glycol (1 mole), lactic acid (2 moles) and butyric acid (2 moles); complex ester prepared from neopentyl glycol (2 moles), dicarboxylic acids (1 mole), monocarboxylic acids (2 moles) and complex esters prepared from neopentylglycol (1 mole) dicarboxylic acids (2 moles) and onohydric neoalcohols, e.g. 2,2,4-trimethylpentanol (2 moles).

Another class of fluids which are suitable as base stocks for this invention are represented by the structure

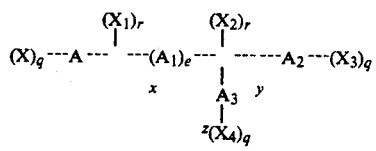

where A, $A_1$, $A_2$, $A_3$ are each a chalkogen having an atomic number of 8 to 16; each q is a whole number having a value of 1 to 5; each r is a whole number having a value of 1 to 4, X, $X_1$, $X_2$, $X_3$, and $X_4$ each are selected from the group consisting of hydrogen, alkyl, haloalkyl, halogen, arylalkyl and substituted arylalkyl, x, y and z are whole numbers each having a value of 0 to 8 and e is a whole number having a value of 0 to 1 provided that when e is 0, y can have a value of 0 to 1 provided that when e is 0, y can have a value of 1 to 2. Typical examples of alkyl and substituted alkyl radicals are given above. Typical examples of such fluids are 2- to 7-ring ortho-, meta- and parapolyphenyl ethers and mixtures thereof. 2- to 7-ring other- meta- and parapolyphenyl tiotheres and mixtures thereof, mixed polyphenyl etherthioether compounds in which at least one of the calkogens represented by A, $A_1$, $A_2$, and $A_3$ is dissimilar within respect to any one of the other chalkogens, dihalogenated diphenyl ethers, such as 4-bromo-3'-chloro-diphenyl ethers and bisphenoylbiphenyl compounds and mixtures thereof. It is also contemplated within the scope of this invention that the phenyl and penylkene groups in the aforedescribed aromatic ether compounds can be partially or totally replaced by a heterocyclic group such as thiophene or pyridene. Such heterocyclic groups can contain from 4 to 10 hereto atoms optionally interrupted by from 1 to 4 hetero atoms such as oxygen, nitrogen and sulfur.

Examples of the polyphenyl ethers contemplated are the bis(phenoxyphenyl) eters, e.g. bis(m-phenoxyphenyl) phenyl) ether, the bix(phenoxyphenoxy) benzenes, e.g., m-bis(m-phenoxyphenoxy) benzene, m-bis(p-phenoxy) benzene, o-bis(o-pheonoxyphenoxy)benzene, the bix(phenoxyphenoxyphenyl) ethers, e.g. bix[m-(m-phenoxyphenoxy) phenyl] ether, bix[p-(p-phenoxyphenoxy)phenyl] ether, bix[p-(p-phenoxyphenoxy)phenyl] ether, m-[(m-phenoxyphenoxy) (o-phenoxyphenoxy)] ether and the bix(phenoxyphenoxy)benzenes, e.g. m-bix[m-(m-phenoxyphenoxy) phenoxy]benzene, p-bis[p-(m-phenoxyphenoxy) phenoxy]benzene, m-bix[(m-p-phenoxyphenoxy)phenoxy] benzene and mixtures thereof with other polyphenyl ethers.

Typical examples of polyphenyl thioethers and mixed polyphenyl ethers and thioethers are 2-phenylmercapto- 4'-phenoxydiphenyl sulfide, 2-phenoxy-3'-phenylmercaptodiphenyl sulfide, o-bis (phenylmercapto) benzene, phenylmercaptobiphenyl, m-(m-chlorophenylmercapto)-m-phenylmercapto-benzene, phenylmercapto (phenoxy)biphenyl, m-chlorodiphenyl sulfide, bis(o-pheyylmercaptophenyl) sulfide, m-bis(m-phenylmercaptophenylmercapto)benzene, 1,2,3-tris (phenylmercapto) benzene, o-bis (p-phenylmercaptophenylmercapto)benzene, 2,2'-bis(phenylmercapto)diphenyl ether, 3,4'-bis(m-polylmercapto)diphenyl ether, 3,3'-bis(xylylmercapto) diphenyl ether, 3,4'-bis(m-isopropyl phenylmercapto) diphenyl ether, 3,3'-bis(m-trifluorome thylphenyl mercapto)diphenyl ether, 3,4'-bis(m-perfluorobutyl phenylmercapto)diphenyl ether, 2-m-tolyloxy-2'-phenylmercaptodiphenyl sulfur, o-bis(-phenylmercapto) benzene, bix(m-phenylmercaptophenyl) sulfide, m-phenyl mercaptophenylk-p-phenylmercaptophenyl sulfide, the trisphenylmercaptobenzenes such as 1,2,4-trisphenylmer captobenzene, 3,3'-bis(-phenylmercapto) dipneyl, m-bis(p-phenylmercaptophenylmercapto)benzene, m-bis-(m-phenylmercaptophenylnercapto)benzene, bis[m-(m-phenyl mercaptophenylmercapto)phenyl] sulfide, 3,3'-bis (phenylmercapto idphenyl ether, 3,3'-bis(phenoxy) diphenyl sulfide, 3-phenoxy-3'-phenylmercaptodiphenyl sulfide, 3-phenylmerdapto-3'-phenoxydiphenyl ether. 3,4'-bis(-phenylmercapto)diphenyl ether, m-bis(mophenylmercaptophenoxy)benzene,3-phenylmercapto-3'-(m-phenyl mercaptophenylmercapto)diphenyl ether.

Other base stocks which are useful are mono- and dialkylthiophenes. Typical examples of thiophenes are 2,5-(1-hexyl-1-methylnonyl)thiophene, 2,4-(1-hexyl-1-methylnonyl)thiophene, 2-tert-butyl thiophene, 2,5-tert-butyl thiophene, 2,5-(1,1-dimethylpropyl) thiophene, 2,5-(1-butyl-1-octylnonyl)thiophene, 2,5(1-propyl-cycobutyl)thiophene, 2-tert-butyl-4-(-1-octyl-1-methyloctadecyl) thiophene, 2,5-(1-methylcyclohexyl) thiophene, 2,5-(1-octyl-1-methyldecyl)thiophene, 2,5-(1,1-dimethyltridecyl)thiophene,2,5-(1,1-dimethyltridecyl)thioiphene, 2,3-(1,1-dimethyltridecyl) thiophene, 2,4-(1,1-dimethyltridecyl)thiophene, 2,4-(1-methylcyclo pentyl)thiophene, and 2,5-(1-n-dodecylpentyl)thiophene.

Hydrocarbon materials, including both hydrocarbon materials derived from petroleum sources such as, for example, mineral oils, fuel oils and kerosene types and synthetic hydrocarbon oils, are suitable base stocks. The physical characteristics of fluids derived from a mineral oil are selected o the basis of the requirements of the fluid systems and therefore this invention includes as fluids mineral oils having a wide range of viscosities and volatilities such as naphthionic base, paraffinic base and mixed base mineral oils.

The synthetic hydrocarbon oils include but are not limited to those oils derived from oligomerization of olefins such as polybutenes and oils derived form high alpha olefins of from 8 to 20 carbon atoms by acid catalyzed dimerization and by oligomerization using trialuminum alkyls as catalysts.

Another fluid which is suitable is chlorinated aromatic 5, such as chlorinated biphenyl. It is also contemplated within the scope of this invention that mixture of individual compounds which are included in a generic type of fluid can be utilized as a fluid within the scope of this invention. For example, two different polyesters can be blended together to form a fluid. In addition, it is contemplated within the scope of this invention that the various generic types of fluids can be blended together to form fluids. Thus, a mixture of 5-ring polyphenyl ethers can be blended with a polycarboxylic acid ester to form a fluid.

An additional example of the use of various generic fluids which can be blended together to form a fluid is a base stock prepared by blending from about 10% to about 50% of a hydrocarbon oil with from about 30% to 60% of a chlorinated biphenyl and from about 5% to about 25% of an ester of acid of phosphorus such as a triarylphosphate. In addition, it is contemplated that other additives and materials such as blending agents can be added to the above base stocks. Thus, for example, a blending agent such as tri- or tetrachlorobenzene can be added to the above mixture comprising a hydrocarbon oil, an ester of an acid of phosphorus and a chlorinated biphenyl.

The fluid compositions of this invention when utilized as a field dependent fluid can also contain dyes, pour point depressants, metal deactivators, acid scavengers, antioxidants, defoamers in concentration sufficient to impart antifoam properties, such as from about 10 to about 100 parts per million, viscosity index improvers such as polyalkylacrylates, polyalkylmethacrylates, polycyclic polymers, polkyurethanes, polyalkylene oxides, polyalkylenes, polyphenylene oxides and polyesters, lubricity agents and the like.

It is also contemplated within the scope of this invention that the fluids as aforedescribed can be utilized singly or as a fluid composition containing two or more base stocks in varying proportions. The fluids can also contain other fluids which include in addition to the functional fluids desired above fluids derived from coal products, and synthetic oils, e.g., alkylene polymers (such as polymers of propylene, butylene, etc., and the mixtures thereof), alkylene oxide-type polymers (e.g., propylene oxide polymers) and derivatives, including alkylene oxide polymers prepared by polymerizing the alkylene oxide in the presence of water or alcohols, e.g., ethyl alcohol, alkyl benzenes, (e.g., monoalkyl benzene such as dodecyl benzene, tetradecyl benzene, etc.), and dialkyl benzenes (e.g., n-nonyl 2-ethyl hexylbenzene); polyphenyls (e.g., biphenyls and terphenylso), halogenated benzene, halogenated lower alkyl benzene, monohalogenated diphenyl ethers (e.g., fluoro-, bromo- and chlorohalogenated benzenes such as m-dibromobenzene, fluoro-, bromo- or chlorohalogenated lower alkyl-substituted benzene and bromo- and chloromonohalogenated diphenyl ether), trialkyl phosphine oxides, diarylalkyl phosphonates, trialkyl phosphonates, aryldialkyl phosphonates and triaryl phosphonates.

Certain of these and other aspects the present invention are set forth in the following description of the accompanying drawing.

BRIEF DESCRIPTION OF THE DRAWINGS

FIG. 1 is a block flow diagram illustrating a process for producing certain of the present coated substrates.

DETAILED DESCRIPTION OF THE DRAWINGS

The following description specifically involves the coating of randomly oriented, woven mats of C-glass fibers. However, it should be noted that substantially the sam process steps can be used to coat other substrate forms and/or materials.

A process system according to the present invention, shown generally at 10, includes a preheat section 12, a coating section 14, an equilibration section 16 and an oxidation/sintering section 18. each of these sections is in fluid communication with the others. Preferably, each of these sections is a separate processing zone or section.

First gas curtain 20 and second gas curtain 22 provide inert gas, preferably nitrogen, at the points indicated, and, thereby effectively insure that preheat section 12, coating section 14 and equilibrium section 16 are maintained in a substantially inert environment. First exhaust 24 and second exhaust 26 are provided to allow vapors to exit or be vented from process system 10.

Randomly oriented woven mats of C-glass fibers from substrate source 28 is fed to preheat section 12 where the mats are preheated up to a maximum of 375° C. for a time of 1 to 3 minutes at atmospheric pressure to reach thermal equilibrium. These mats are composed of from 8 micron to 35 micron diameter C- or T-glass randomly oriented or woven fibers. The mats are up to 42 inches wide and between 0.058 to 0.174 mil thick. The mats are fed to process system 10 at the rate of about 1 to 5 feet per minute so that the fiber weight through is about 0.141 to about 2.1 pounds per minute.

The preheated mats pass to the coating section 14 where the mats are contacted with an hydrous mixture of 70% to 95% by weight of stannous chloride and 5% to 30% by weight of stannous fluoride from raw material source 30. This contacting effects a coating of this mixture on the mats.

This contacting may occur in a number of different ways. For example, the $SnCl_2/SnF_2$ mixture can be combined with nitrogen to form a vapor which is at a temperature of from about 25° C. to about 150° C. higher than the temperature of the mats in the coating section 14. As this vapor is brought into contact with the mats, the temperature differential between the mats and the vapor and the amount of the mixture in the vapor are such as to cause controlled amounts of $SnCl_2$ and $SnF_2$ to condense on and coat the mats.

Another approach is to apply the $SnCl_2/SnF_2$ mixture in a molten form directly to the mats in an inert atmosphere. There are several alternatives for continuously applying the molten mixture to the mats. Obtaining substantially uniform distribution of the mixture on the mats ia a key objective. For example, the mats can be compressed between two fillers that are continuously coated with the molten mixture. Another option is to spray the molten mixture onto the mats. The fiber mats may also be dipped directly into the melt. The dipped fiber mats may be subjected to a compression roller step, a vertical lift step and/or a vacuum filtration step to remove excess molten mixture from the fiber mats.

An additional alternative is to apply the $SnCl_2/SnFn_2$ in an organic solvent. The solvent is then evaporated, leaving a substantially uniform coating of $SnCl_2/SnF_2$ on the fiber mats. The solvent needs to be substantially none-reactive (at the conditions of the present process) and provide for substantial solubility of $SnCl_2$ and $SnF_2$. For example, the dipping solution involved should preferably be at least about 0.1 molar in $SnCl_2$/ Substantially anhydrous solvents comprising acetonitrile, ethyl acetate, dimethyl sulfoxide, propylene carbonate and mixtures thereof are suitable. Stannous fluoride is often less soluble in organic solvents than is stannous chloride. One approach to overcoming this relative insolubility of $SnF_2$ is to introduce $SnF_2$ onto the fiber mats after the fiber mats are dipped into the $SnCl_2$ solution with organic solvent. Although the dopant may be introduced in the sintering section 18, it is preferred to incorporate the dopant in the coating section 14 or the equilibration section 16, more preferably the coating section 14.

Any part of process system 10 that is exposed to $SnCl_2$ and/or $SnF_2$ melt or vapor is preferably corrosion resistant, more preferably lined with inert refractory material.

In any event, the mats in the coating section 14 are at a temperature of up to about 375° C., and this section is operated at slightly less than atmospheric pressure. If the $SnCl_2/SnF_2$ coating is applied as a molten melt between compression rollers, it is preferred that such compression rollers remain in contact with the fiber mats for about 0.1 to about 2 minutes, more preferably about 1 to about 2 minutes.

After the $SnCl_2/SnF_2$ coating is applied to the fiber mats, the fiber mats are passed to the equilibration section 16. Here, the coated fiber mats are maintained, preferably at a higher temperature than in coating section 14, in a substantially inert atmosphere for a period of time, preferably up to about 10 minutes, to allow the coating to more uniformly distribute over the fibers. In addition, if the fluorine component is introduced onto the fiber mats separate from the stannous chloride, the time the coated fiber mats spend in the equilibration section 16 results in the dopant component becoming more uniformly dispersed or distributed throughout the stannous chloride coating. Further, it is preferred that any vapor and/or liquid which separate from the coated fiber mats in the equilibration section 16 be transferred back and used in the coating section 14. This preferred option, illustrated schematically in FIG. 1 by lines 32 (for the vapor) and 34 (for the liquid) increases the effective overall utilization of $SnCl_2$ and $SnF_2$ in the process so that losses of these components, as well as other materials such as solvents, are reduced.

The coated fiber mats are passed from the equilibration zone 16 into the sintering zone 18 where such fiber mats are contacted with an oxidizer, such as an oxygen-containing gas, from line 36. The oxidizer preferably comprises a mixture of air and water vapor. This mixture, which preferably includes about 1% to about 50% m more preferably about 15% to about 35%, by weight of water, is contacted with the coated fiber mats at atmospheric pressure at a temperature of about 400° C. to about 550° C. for up to about 10 minutes. Such contacting results in converting the coating on the fiber mats to a fluorine doped tin dioxide coating. The fluorine doped tin oxide coated fiber mats product, which exits sintering section 18 via line 38, has useful electric conductivity properties. This product preferably has a doped tin oxide coating having a thickness in the range of about 0.5 microns to about 1 micron, and is particularly useful as a component in a lead-acid battery. Preferably, the product is substantially free of metals contamination which is detrimental to electrical conductivity.

The present process provides substantial benefits. For example, the product obtained has a fluorine doped tin oxide coating which has useful properties, e.g., outstanding electrical and/or morphological properties. This product may be employed in a lead-acid battery or in combination with a metallic catalyst to promote chemical reactions, e.g., chemical reductions, or alone or in combination with a metallic sensing component to provide sensors, e.g., gas sensors. High utilization of stannous chloride and fluorine components is achieved. In addition, high coating deposition and product throughout rates are obtained. Moreover, relatively mild conditions are employed. For example, temperatures within sintering section 19 can be significantly less than 600° C. The product obtained has excellent stability and durability.

EXAMPLE 1

A substrate made of C-glass was contacted with a molten mixture containing 30 mol % $SnF_2$ and 70 mol % $SnCl_2$. This contacting occurred at 350° C. in an argon atmosphere at about atmospheric pressure and resulted in a coating containing $SnCl_2$ and $SnF_2$ being placed on the substrate.

This coated substrate was then heated to 375° C. and allowed to stand in an argon atmosphere at about atmospheric pressure for about 5 minutes. The coated substrate was then fired at 500° C. for 20 minutes using flowing, at the rate of one (1) liter per minute, water saturated air at about atmospheric pressure. This resulted in a substrate having a fluorine doped tin oxide coating with excellent electronic properties. For example, the volume resistivity of this material was determined to be $7.5 \times 10^{-4}$ ohm-cm.

In the previously noted publication "Preparation of Thick Crystalline Films of Tin Oxide and Porous Glass Partially Filled with Tin Oxide," an attempt to produce antimony doped tin oxide films on a 96% silica glass substrate involving stannous chloride oxidation at anhydrous conditions resulted in a material having a volume resistivity of $1.5 \times 10^{-7}$ ohm-cm The present methods and products, illustrated above, provide outstanding advantages. For example, the fluorine doped tin oxide coated substrate prepared in accordance with the present invention has improved, i.e., reduced, electronic resistivity, relative to substrates produced by prior methods.

EXAMPLE 2

Stannous chloride powder is applied to a 26 inches by 26 inch glass fiber non woven mat in the form of a powder (10 to 125 microns in average particle diameter)i shaken from a powder spreading apparatus positioned 2 to about 5 feet above the mat. An amount of stannous fluorine powder (10 to about 125 microns in average particle diameter) is added directly to the stannous chloride powder to provide fluoride dopant for the final tin oxide product. The preferred range to achieve low resistance tin oxide products is about 15% to about 20% by weight of stannous fluoride, based on the total weight of the powder. The powder-containing mat is placed into a coating furnace chamber at 350° C. and maintained at this temperature for approximately 20 minutes. During this time a downflow of 9.0 liters per minute of nitrogen heated to 350° C. to 350° C. is maintained in the chamber.

In the coating chamber the stannous chloride powder melts and wicks along the fiber to from a uniform coating. In addition, a small cloud of stannous chloride vapor can form above the mat. This is due to a small refluxing action in which hot stannous chloride vapors rise slightly and are then forced back down into the mat for coating and distribution by the nitrogen downflow. This wicking and/or refluxing is believed to aid in the uniform distribution of stannous chloride in the coating chamber.

The mat is when moved into the oxidation chamber. The oxidation step occurs in a molecular oxygen-containing atmosphere at a temperature of 525° C. for a period of time of 10 to 20 minutes. The mat may be coated by this process more than once to achieve thicker coatings.

EXAMPLE 3

Example 2 is repeated except that the powder is applied to the mat using a powder sprayer which includes a canister for fluidizing the powder and provides for direct injection of the powder into a spray gun. The powder is then sprayed directly on the mat, resulting in a highly uniform powder distribution.

EXAMPLE 4

Example 2 is repeated except that the powder is applied to the mat by pulling the mat through a fluidized bed of the powder, which is an average particle diameter of about 5 to about 125 microns.

EXAMPLE 5 to 7

Examples 2, 3 and 4 are repeated except that, prior to contacting with the powder, the mat is charged by passing electrostatically charged air over the mat. The powder particles are charged with an opposite charge to that of the mat. The use of oppositely charged mat and powder acts to assist or enhance the adherence of the powder to the mat.

EXAMPLES 8 TO 13

Examples 2 to 7 are repeated except that no stannous fluoride is included in the powder. Instead, hydrogen fluoride gas is included in the downflow nitrogen gas in the chamber. The preferred weight ratio of tin to fluoride fed to the chamber to achieve low resistance tin oxide products is in the range of about 0.05 to about 0.2.

In each of the Examples 2 to 13, the final coated product includes an effectively fluoride doped tin oxide-containing coating having a substantial degree of uniformity.

EXAMPLES 14 TO 16

Examples 2, 3 and 4 were repeated except that a silica platelet having an average particle size of from 3.5 microns to 4.9 microns was incorporated into the powder composition at a concentration of about 30 wt %. Prior to processing the mat in the equilibration and oxidation section of the reactor, a second mat was placed underneath the coated mat. After processing the particulate material incorporated as part of the powder was removed from the top and bottom mats and was found to have a thin, i.e., less than 0.3 micron, uniform coatings of tin dioxide on the complete particle surface.

EXAMPLE 17

Example 15 was repeated except that a soda lime, borosilicate glass hollow sphere bubble having a density in the range of 0.57 to 0.63 and an isostatic pressure crush strength of from 6,000 to 15,000 psi was substituted for the silica particulate. The glass spheres were essentially spherical and had a diameter ranging from 5 to about 60 microns.

EXAMPLE 18

A commercial spray pyrolysis process unit was used to compare the processing of a flat glass soda lime substrate with the processing of a non-woven porous mat of the type set forth in example 1. The spray pyrolysis unit had a process capability to coat a flat glass having a dimension of from 3 feet in width to 5 feet in length. In the unit a solution composition was atomized and sprayed directly at the surface. The temperature of the substrate was obtained by placing the substrate within an electrically heated furnace. The substrate was then removed from the furnace and immediately contacted with the atomized solution spray. The deposition parameters were as follows: temperature 500° C., gas delivery pressure solution 30 psi, compressed air 40-60 psi, spray configuration—round spray, vertical deposition, final coat distance—16" to 18", solution feed rate—5-20 ml per minute, spraying time 30-60 seconds. The spray solution contained 50% stannic chloride, deionized water, methanol and hydrofluoric acid (48 wt %) in a ratio of about 1 to 1 to 1 to 0.1. The following results were obtained from the processing of a flat soda lime glass, and a non-woven C glass mat having a thickness of about 0.65", a dimension of 16"×16" and a bulk porosity of about 90%. Each substrate was processed according to the above conditions and after processing it was determined that the flat glass had a resistivity of 10 ohms per square while the C glass mat had no evidence of a coating. The process was repeated except that that mat was placed in front of the flat glass. After processing, there was no evidence of coating on the C glass mat. However, the backside flat glass had a conductive coating. Following the failure to coat the glass mat, using state of the art, spray pyrolysis technology, the process unit was modified by placing a 1" thick stainless steel plate on which to vertically mount the C glass mat. The mat after processing with the 1" stainless steel backing produced a resistivity of 600-800 ohms per square on the inner surface of the mat. The process unit was again modified to place mesh screens over the front of the mat, accompanied by bolting of the screens to the back of the stainless steel plate. The results of the combination of steel plate and mesh plate over the front of the mat was a mat conductivity of 5-6 ohms per square. However, the mesh plate obstructed the contact of the spray solution with the mesh underlying portions of the glass mat. In order to achieve a conductivity of 5-6 ohms per square, 20 coatings on both the front and back sides were required. The modifications made to the state of the art process unit, were not available in the prior art.

EXAMPLE 19

A horizontal continuous chemical vapor deposition (CVD) furnace manufactured by Watkins-Johnson was evaluated for the coating of the non-woven fabric of Example 1. The furnace is described in Circuits Manufacturing, October 1975. The furnace differs from the spray pyrolysis system of Example 18 by the continuous nature of the furnace and the use of vapor deposition of reactants. The furnace temperature could be profiled to reach approximately 560° C. and has been used to produce tin dioxide coated flat glass in one pass. The CVD furnace used tetramethyl tin, or stannic chloride as the vaporous tin source. The fluoride dopant source used with tetramethyl tin was trifluorobromo methane and with stannic chloride was hydrofluoric acid. The oxidant in the CVD furnace was a combination of water (vapor) and methanal. The non-woven mat used to evaluate the state of the art process equipment, was the same non-woven mat used in Examples 1 and 18. The process was evaluated using the highest temperature attainable in the oven using the slowest belt speed and at conditions to maximize reactant deposition and formation of a fluoride doped tin dioxide. A series of 25 process runs were made in the furnace and it was determined that essentially no deposition and coating was obtained on the non-woven mat. The same conditions with flat glass produced highly conductive tin dioxide coatings on soda lime glass.

EXAMPLE 20

An electrolysis tin oxide deposition method that had been used experimentally on flat surfaces was evaluated for coating non-woven mat of the type set forth in examples 1, 18 and 19. The method was based on the controlled homogenous precipitation of tin hydrate hydroxide from an aqueous solution of stannic chloride complexed with ammonium chloride. In the method, a catalyst (silver nitrate) is added in order to initiate precipitation. Precipitation begins when the substrate is immersed and the pH is brought up to 7.5 with sodium hydroxide. The results obtained when a non-woven fabric was utilized in the process were very low deposition rates, poor materials utilization, poor coating adhesion, poor fiber coating, i.e., clumps, poor continuity of the fiber, very low to zero dopant incorporation and a very high resistivity tin oxide.

The results set forth in examples 18, 19 and 20 demonstrate the difficult and substantial problems associated with the coating of shielded surfaces and/or 3-D type substrates. In examples 18 and 19, the substitution of a 3-dimensional, non-woven fabric for a flat glass substrate in units which are used to effectively coat flat glass were unsuccessful in their application to a 3-dimensional substrates and/or substrates with shielded surfaces. In addition, example 20 demonstrates the difficulty in processing 3-D substrates, i.e., very high resistivity and in addition, the difficult problem of incorporation of a dopant to provide enhanced electrical conductivity. A comparison between example 1 and examples 18, 19 and 20 demonstrate the unexpected, unique advantages and advances of the processes of this invention and the unique products for use in a wide variety of applications.

While this invention has been described with respect to various specific examples and embodiments, it is to be understood that the invention is not limited thereto and that it can be variously practiced within the scope of the following claims.

What is claimed is:

1. A field dependent fluid comprising a fluid phase and a dispersed conductive material phase said conductive material comprising an inorganic three dimensional solid substrate having a coating containing electronically conductive tin dioxide on at least a portion thereof.

2. A field dependent fluid comprising a fluid phase and a dispersed conductive material phase said conductive material comprising an inorganic three dimensional solid substrate having a coating containing electronically conductive tin oxide on at least a portion thereof said coating on said substrate being controlled and structured to enhance the response of the field dependent fluid.

3. The fluid of claim 1 wherein the inorganic substrate is selected from the group consisting of a glass or a ceramic.

4. The fluid of claim 2 wherein said coating has a thickness in the range from about 0.1 micron to about 10 microns.

5. The fluid of claim 1 wherein said coating further includes a controlling amount of fluoride dopant for enhanced field dependent fluid response.

6. The fluid of claim 2 wherein said coating further includes a controlling amount of fluoride dopant for enhanced field dependent fluid response.

7. The fluid of claim 1 wherein the inorganic substrate is selected from the group consisting of a titania, alumina, silica alumina, zeolite modified, silica, inorganic oxide and mixtures thereof.

8. The fluid of claim 2 wherein the inorganic substrate is selected from the group consisting of a titania, alumina, silica alumina, zeolite modified, silica, inorganic oxide and mixtures thereof.

9. The fluid of claim 5 wherein the inorganic substrate is selected from the group consisting of a titania, alumina, silica alumina, zeolite modified, silica, inorganic oxide and mixtures thereof.

10. The fluid of claim 1 wherein said coated substrate is produced in accordance with a process comprising: contacting a substrate with a composition comprising a tin chloride-forming compound at conditions effective to form a liquidus tin chloride containing coating on at least a portion of said substrate; and contacting said substrate having said tin chloride containing coating hereon with an oxidizing agent at conditions effective to convert tin chi ·.de to tin oxide.

11. The fluid of claim 1 wherein said coated substrate is produced in accordance with a process comprising: contacting a substrate with a composition comprising a tin chloride-forming compound at conditions effective to form liquidus tin chloride-containing coating in at least a portion of said substrate; and contacting said substrate having said tin chloride containing coating hereon with an oxidizing agent at conditions effective to convert tin chloride to tin oxide.

12. The fluid of claim 13 wherein said coated substrate is produced in accordance with a process comprising: contacting a substrate with a composition comprising a tin chloride-forming compound at conditions effective to form liquidus a tin chloride-containing coating on at least a portion of said substrate; and contacting said substrate having said tin chloride-containing coating hereon with an oxidizing agent at conditions effective to convert tin chloride to tin oxide.

13. The fluid of claim 1 wherein said coating further includes a controlling amount of dopant for enhanced field dependent fluid response.

14. The fluid of claim 2 wherein said coating further includes a controlling amount of dopant for enhanced field dependent fluid response.

15. The fluid of claim 7 wherein said coating further includes a controlling amount of dopant for enhanced field dependent fluid response.

16. The fluid of claim 8 wherein said coating further includes a controlling amount of dopant for enhanced field dependent fluid response.

17. The fluid of claim 14 wherein said dopant is a fluoride dopant.

18. The fluid of claim 16 wherein said dopant is a fluoride dopant.

19. The fluid of claim 2 wherein the inorganic substrate is selected from the group consisting of a glass or a ceramic.

20. The fluid of claim 19 wherein said coating further includes a controlling amount of dopant for enhanced field dependent fluid response.

21. The fluid of claim 20 wherein said dopant is a fluoride dopant.

22. The fluid of claim 1 wherein the inorganic substrate is substantially nonelectronically conductive.

23. The fluid of claim 2 wherein the inorganic substrate is substantially nonelectronically conductive.

24. The fluid of claim 1 wherein the inorganic three dimensional substrate includes external surfaces and shielded surfaces which are at least partially shielded by other portions of said substrate and said tin oxide coating is on at least a portion of said three dimensions of said substrate including the shielded surfaces of said substrate.

25. The fluid of claim 2 wherein the inorganic three dimensional substrate includes external surfaces and shielded surfaces which are at least partially shielded by other portions of said substrate and said tin oxide coating is on at least a portion of said three dimensions of said substrate including the shielded surfaces of said substrate.

26. The fluid of claim 17 wherein the inorganic three dimensional substrate includes external surfaces and shielded surfaces which are at least partially shielded by other portions of said substrate and said tin oxide coating is on at least a portion of said three dimensions of said substrate including the shielded surfaces of said substrate.

27. The fluid of claim 1 wherein said substrate is in the form of a sphere.

28. The fluid of claim 2 wherein said substrate is in the form of a sphere.

29. The fluid of claim 6 wherein said substrate is in the form of a sphere.

30. The fluid of claim 21 wherein said substrate is in the form of a sphere.

* * * * *